United States Patent
Noguchi et al.

(10) Patent No.: US 8,164,857 B2
(45) Date of Patent: Apr. 24, 2012

(54) MAGNETIC SIGNAL REPRODUCTION SYSTEM EMPLOYING A SPIN-VALVE MR HEAD DEVELOPED FOR HIGH-DENSITY RECORDING AND A SPIN-VALVE MR HEAD AND MAGNETIC SIGNAL REPRODUCTION METHOD FOR REPRODUCING MAGNETIC SIGNALS IN WHICH A SPIN-VALVE MR HEAD IS EMPLOYED

(75) Inventors: Hitoshi Noguchi, Kanagawa (JP);
Osamu Shimizu, Kanagawa (JP);
Yasushi Endo, Kanagawa (JP)

(73) Assignee: FUJIFILM Corporation, Tokyo (JP)

( * ) Notice: Subject to any disclaimer, the term of this patent is extended or adjusted under 35 U.S.C. 154(b) by 796 days.

(21) Appl. No.: 12/129,131

(22) Filed: May 29, 2008

(65) Prior Publication Data
US 2008/0297950 A1     Dec. 4, 2008

(30) Foreign Application Priority Data

May 31, 2007  (JP) ................. 2007-146256
Jul. 27, 2007  (JP) ................. 2007-196594

(51) Int. Cl.
*G11B 5/70* (2006.01)
*G11B 5/71* (2006.01)

(52) U.S. Cl. ..................... 360/134; 428/842.8
(58) Field of Classification Search .......... 360/324, 360/55, 134; 428/840.2, 840.3, 842.8
See application file for complete search history.

(56) References Cited

U.S. PATENT DOCUMENTS

| | | | |
|---|---|---|---|
| 5,122,414 A | 6/1992 | Shimizu et al. | |
| 6,228,461 B1 * | 5/2001 | Sueki et al. | 428/98 |
| 6,277,505 B1 | 8/2001 | Shi et al. | |
| 6,404,588 B1 * | 6/2002 | Hasegawa et al. | 360/125.51 |
| 6,563,681 B1 | 5/2003 | Sasaki et al. | |
| 6,680,088 B2 * | 1/2004 | Naoe et al. | 427/565 |
| 6,994,925 B2 * | 2/2006 | Masaki | 428/842.8 |
| 7,041,398 B2 * | 5/2006 | Doushita | 428/842.4 |
| 7,166,377 B2 * | 1/2007 | Murao | 428/840.2 |
| 7,300,714 B2 * | 11/2007 | Kurose et al. | 428/840.3 |
| 7,300,715 B2 * | 11/2007 | Kurose et al. | 428/840.3 |
| 2002/0051877 A1 * | 5/2002 | Kakuishi | 428/323 |
| 2003/0157372 A1 * | 8/2003 | Ozawa et al. | 428/694 BP |

(Continued)

FOREIGN PATENT DOCUMENTS

EP    0207391    1/1987

(Continued)

OTHER PUBLICATIONS

An Extended European Search Report dated Feb. 2, 2009.

*Primary Examiner* — Angel A. Castro
(74) *Attorney, Agent, or Firm* — Sughrue Mion, PLLC

(57) ABSTRACT

The magnetic signal reproduction system comprises a magnetic recording medium comprising a magnetic layer comprising a ferromagnetic powder and a binder on a nonmagnetic support; and a reproduction head, wherein a number of protrusions equal to or greater than 10 nm in height on the magnetic layer surface, as measured by an atomic force microscope, ranges from 50 to 2500/10,000 $\mu m^2$, a quantity of lubricant on the magnetic layer surface, denoted as a surface lubricant index, ranges from 0.5 to 5.0, a surface abrasive occupancy of the magnetic layer ranges from 2 to 20 percent, and the reproduction head is a magnetoresistive magnetic head comprising a spin-valve layer.

18 Claims, 2 Drawing Sheets

U.S. PATENT DOCUMENTS

| | | |
|---|---|---|
| 2005/0048324 A1 | 3/2005 | Ejiri |
| 2005/0167770 A1 | 8/2005 | Fukuzawa et al. |
| 2009/0027812 A1 | 1/2009 | Noguchi et al. |

FOREIGN PATENT DOCUMENTS

| | | |
|---|---|---|
| EP | 0520504 | 12/1992 |
| GB | 2080319 | 2/1982 |
| JP | 01-119916 | 5/1989 |
| JP | 11-185242 | 7/1999 |
| JP | 2000-340858 | 12/2000 |
| JP | 2001-202605 | 7/2001 |
| JP | 2001-331924 A | 11/2001 |
| JP | 2004-273070 A | 9/2004 |
| JP | 2005-071537 A | 3/2005 |
| JP | 2005-216349 | 8/2005 |
| JP | 2005-243162 A | 9/2005 |

* cited by examiner

Support

MAGNETIC SIGNAL REPRODUCTION SYSTEM EMPLOYING A SPIN-VALVE MR HEAD DEVELOPED FOR HIGH-DENSITY RECORDING AND A SPIN-VALVE MR HEAD AND MAGNETIC SIGNAL REPRODUCTION METHOD FOR REPRODUCING MAGNETIC SIGNALS IN WHICH A SPIN-VALVE MR HEAD IS EMPLOYED

CROSS-REFERENCE TO RELATED APPLICATIONS

This application claims the benefit of priority under 35 USC 119 to Japanese Patent Application No. 2007-146256 filed on May 31, 2007 and Japanese Patent Application No. 2007-196594 filed on Jul. 27, 2007, which are expressly incorporated herein by reference in their entirety.

BACKGROUND OF THE INVENTION

1. Field of the Invention

The present invention relates to a magnetic signal reproduction system and magnetic signal reproduction method. More particularly, the present invention relates to a magnetic signal reproduction system comprising a magnetic recoding medium suited to a magnetic signal reproduction system employing a spin-valve MR head developed for high-density recording and a spin-valve MR head, and a magnetic signal reproduction method for reproducing magnetic signals in which a spin-valve MR head is employed to reproduce signals recorded on the magnetic recording medium.

2. Discussion of the Background

Magnetoresistive heads (MR heads) operating on the principle of magnetoresistive (MR) effects have been proposed in recent years. MR heads achieve several times the reproduction output of conventionally employed inductive magnetic heads. Since they do not employ induction coils, they also permit a substantial reduction in device noise such as impedance noise. Thus, MR heads are widely employed to enhance high-density recording and reproduction characteristics, particularly in hard disk drives. The mounting of MR heads in flexible disk systems has also been proposed, and MR heads are currently in use in backup tape systems.

In contrast to hard disk drives, in which signal reproduction is conducted without contact between the medium and the head, there is sliding contact between the medium and the head during reproduction in flexible disk systems and backup tape systems. Thus, when employing an MR head in such a sliding contact system, there is a problem in the form of abrasion of the head due to sliding contact with the medium. Additionally, when the smoothness of the magnetic layer surface is increased to prevent head abrasion, friction on the head increases and it becomes difficult to ensure adequate running stability.

Accordingly, controlling the number of protrusions on the surface of the magnetic layer has been proposed to achieve both low MR head abrasion and running stability. Japanese Unexamined Patent Publication (KOKAI) No. 2005-71537 or English language family member US 2005/0048324 A1 discloses such proposal. The contents of these applications are incorporated herein by reference in their entirety.

In the past, anisotropic magnetoresistive heads (AMR heads) were employed in hard disk drives. However, spin-valve MR heads, which are of even greater sensitivity, have been employed in the hard disk drives of recent years. Spin-valve MR heads have two magnetic layers. The direction of magnetization of one of the magnetic layers (called the "fixed magnetization layer" or "pinned layer") is fixed by an antiferromagnetic layer, while the direction of magnetization of the other magnetic layer (called the "free magnetization layer" or "free layer") changes with the external magnetic field. In spin-valve MR heads, high output can be achieved based on the difference in resistance when the directions of magnetization of these two magnetic layers are parallel and when they are antiparallel.

However, it is required to narrow the track width in spin-valve MR heads developed for high-density recording. When this is done, the MR height (the height of the spin-valve layer in the direction perpendicular to the sliding contact surface) also decreases. As a result, the amount of abrasion that is allowable decreases and performance tends to deteriorate rapidly. It is also required to reduce the length of the reproduction gap in spin-valve MR heads developed for high-density recording. When this is done, smearing (a phenomenon in which a metal material constituting the MR head is spread during sliding contact with the medium, causing electrical shorts) tends to occur.

Thus, when reproducing signals recorded on the medium described in Japanese Unexamined Patent Publication (KOKAI) No. 2005-71537 with a spin-valve MR head, for example, there are problems in that shortened head life and performance deterioration tend to occur due to head abrasion and smearing. Further, since spin-valve MR heads are highly sensitive, noise increases in spin-valve GMR heads even with protrusions of sizes that do not cause problems in AMR heads, precluding the obtaining of adequate electromagnetic characteristics. Further, the smoother the surface of the magnetic layer is made to suppress abrasion and reduce noise, the more the running stability (running property and running durability) decreases due to an increase in the coefficient of friction during running. In this manner, there is a tradeoff between smoothness of the surface of the magnetic layer (to enhance head life and reduce noise) and running stability, making it difficult to achieve both. Thus, the practical use of spin-valve MR heads has been considered difficult in sliding contact systems such as flexible disk systems and backup tape systems. However, recording of even higher density could be achieved if these problems were to be solved and spin-valve MR heads of higher sensitivity were adopted in sliding contact systems.

Further, elements tend to corrode more in spin-valve MR heads than in AMR heads. A protective layer such as a diamond-like carbon (DLC) film is provided on the outermost surface of a spin-valve MR head to increase corrosion resistance in hard disk drives. However, even when a DLC film is provided on the spin-valve MR head, the DLC film ends up being shaved away during sliding content with the medium in the above sliding contact systems. Thus, in sliding contact systems, the providing of a DLC film on a spin-valve MR head can impart resistance to corrosion while still unused, but it is difficult to maintain this corrosion resistance over an extended period during use involving sliding contact.

Accordingly, element corrosion should be solved for spin valve MR heads to be employed in sliding contact systems.

SUMMARY OF THE INVENTION

An aspect of the present invention provides for means for yielding good electromagnetic characteristics and running stability, while making it possible to maintain adequate head life by preventing element corrosion, head abrasion, and smearing in a sliding contact system employing a spin-valve MR reproduction head.

The present inventors conducted extensive research into achieving such means.

First, the present inventors considered regulating the number of protrusions of prescribed height causing head abrasion and noise on the magnetic layer surface to enhance head life and reduce noise during running (signal reproduction) in systems employing spin-valve MR heads. However, as stated above, the more the number of protrusions on the magnetic layer was reduced and the smoother the magnetic layer was made, the greater the coefficient of friction on the head became and the greater the decrease in running stability. Accordingly, the present inventors conducted further research into simultaneously achieving a longer head life, reducing noise, and ensuring running stability. As a result, by controlling the quantity of lubricant and the surface abrasive occupancy on the magnetic layer surface to within prescribed ranges, they discovered that it was possible to simultaneously improve head life, lower noise, and ensure running stability—which have conventionally involved a tradeoff—and surprisingly, to solve element corrosion, in a magnetic recording medium having a magnetic layer in which the number of protrusions of prescribed height is controlled.

The present invention was devised on the basis of this discovery.

An aspect of the present invention relates to a magnetic signal reproduction system comprising:

a magnetic recording medium comprising a magnetic layer comprising a ferromagnetic powder and a binder on a nonmagnetic support; and a reproduction head, wherein a number of protrusions equal to or greater than 10 nm in height on the magnetic layer surface, as measured by an atomic force microscope, ranges from 50 to 2500/10,000 $\mu m^2$, a quantity of lubricant on the magnetic layer surface, denoted as a surface lubricant index, ranges from 0.5 to 5.0, a surface abrasive occupancy of the magnetic layer ranges from 2 to 20 percent, and the reproduction head is a magnetoresistive magnetic head comprising a spin-valve layer.

A further aspect of the present invention relates to a magnetic signal reproduction method reproducing signals, that have been recorded on a magnetic recording medium, with a reproduction head, wherein the magnetic recording medium comprises a magnetic layer comprising a ferromagnetic powder and a binder on a nonmagnetic support, a number of protrusions equal to or greater than 10 nm in height on the magnetic layer surface, as measured by an atomic force microscope, ranges from 50 to 2500/10,000 $\mu m^2$, a quantity of lubricant on the magnetic layer surface, denoted as a surface lubricant index, ranges from 0.5 to 5.0, a surface abrasive occupancy of the magnetic layer ranges from 2 to 20 percent, and the reproduction head is a magnetoresistive magnetic head comprising a spin-valve layer.

The ferromagnetic powder may be a hexagonal ferrite powder.

The hexagonal ferrite powder may have a mean plate diameter ranging from 10 to 50 nm.

The magnetic layer may have a thickness ranging from 10 to 150 nm.

The reproduction head may comprise at least a first shield layer, a first gap layer, a spin-valve layer, a second gap layer and a second shield layer in this order on a support.

The reproduction head may come in sliding contact with the magnetic recording medium during signal reproduction.

At least a surface that contacts with the magnetic recording medium during signal reproduction of the first shield layer and/or the second shield layer may be comprised of amorphous alloy comprising cobalt as a main component.

The reproduction head may have an electrode layer applying an electric current to the spin-valve layer, and at least a surface that contacts with the magnetic recording medium during signal reproduction of the electrode layer may be comprised of metal comprising tantalum as a main component.

The spin-valve layer may exhibit a giant magnetoresistive effect.

The present invention permits the use of spin-valve MR heads in sliding contact systems. It can thus handle even higher recording densities.

Other exemplary embodiments and advantages of the present invention may be ascertained by reviewing the present disclosure and the accompanying drawings.

BRIEF DESCRIPTION OF THE DRAWINGS

The present invention will be described in the following text by the exemplary, non-limiting embodiments shown in the figures, wherein.

Figure 1:
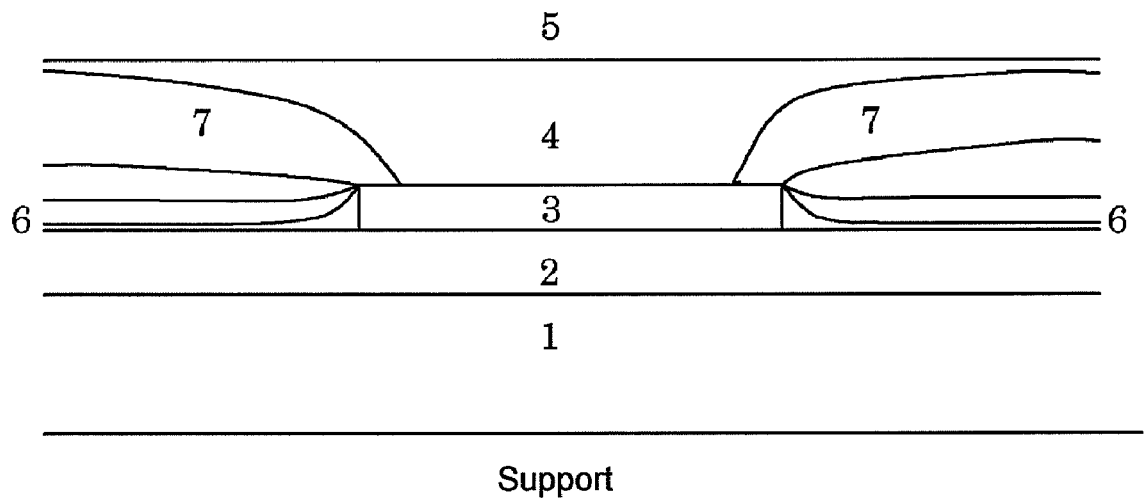
FIG. 1 is a sectional view showing the main components of a spin-valve MR head.

Explanations of symbols in the drawings are a follow:
1 First shield layer
2 First gap layer
3 Spin-valve layer
4 Second gap layer
5 Second shield layer
6 Hard magnetic layer
7 Electrode layer
11 Magnetic tape cartridge
12 Cartridge case
12*c* Opening
13 Leader pin
14 Magnetic tape
15 Reel
17 Leader tape
20 Magnetic recording and reproduction device
21 Leader block
22 Machine reel
25 Magnetic head
26 Tape guide

DETAILED DESCRIPTIONS OF THE EMBODIMENTS

The following preferred specific embodiments are, therefore, to be construed as merely illustrative, and non-limiting to the remainder of the disclosure in any way whatsoever. In this regard, no attempt is made to show structural details of the present invention in more detail than is necessary for fundamental understanding of the present invention; the description taken with the drawings making apparent to those skilled in the art how several forms of the present invention may be embodied in practice.

The magnetic signal reproduction method of the present invention comprises a magnetic recording medium comprising a magnetic layer comprising a ferromagnetic powder and a binder on a nonmagnetic support; and a reproduction head, wherein a number of protrusions equal to or greater than 10 nm in height on the magnetic layer surface, as measured by an atomic force microscope, ranges from 50 to 2500/10,000 µm², a quantity of lubricant on the magnetic layer surface, denoted as a surface lubricant index, ranges from 0.5 to 5.0, a surface abrasive occupancy of the magnetic layer ranges from 2 to 20 percent, and the reproduction head is a magnetoresistive magnetic head comprising a spin-valve layer.

The magnetic signal reproduction method of the present invention reproduces signals, that have been recorded on a magnetic recording medium, with a reproduction head, wherein the magnetic recording medium comprises a magnetic layer comprising a ferromagnetic powder and a binder on a nonmagnetic support, a number of protrusions equal to or greater than 10 nm in height on the magnetic layer surface, as measured by an atomic force microscope, ranges from 50 to 2500/10,000 µm², a quantity of lubricant on the magnetic layer surface, denoted as a surface lubricant index, ranges from 0.5 to 5.0, a surface abrasive occupancy of the magnetic layer ranges from 2 to 20 percent, and the reproduction head is a magnetoresistive magnetic head comprising a spin-valve layer.

The magnetic signal reproduction system and magnetic signal reproduction method of the present invention will be described in detail below.

The magnetic recording medium employed in the magnetic signal reproduction system and the magnetic signal reproduction method of the present invention comprises a magnetic layer comprising a ferromagnetic powder and a binder on a nonmagnetic support. The magnetic recording medium is suitably employed in sliding contact systems in which the magnetic head comes in sliding contact with the magnetic recording medium during signal reproduction. In the present invention, the term "sliding contact" means a state in which a portion of a reproduction head physically contacts the magnetic recording medium during running (signal reproduction). In the above magnetic recording medium, the magnetic layer has surface properties (1) to (3) below, thereby making it possible to simultaneously achieve head life, electromagnetic characteristics, and running stability in a magnetic signal reproduction system, preferably a sliding contact system, employing a magnetic head in the form of a spin-valve MR head:

(1) a number of protrusions equal to or greater than 10 nm in height on the magnetic layer surface, as measured by an atomic force microscope, ranges from 50 to 2500/10,000 µm², (2) a quantity of lubricant on the magnetic layer surface, denoted as a surface lubricant index, ranges from 0.5 to 5.0, and (3) a surface abrasive occupancy of the magnetic layer ranges from 2 to 20 percent.

Below, (1) to (3) above will be described in succession.

In the magnetic recording medium, the number of protrusions equal to or greater than 10 nm in height on the magnetic layer surface as measured by atomic force microscope (AFM) ranges from 50 to 2,500/10,000 µm². When the number of protrusions equal to or greater than 10 nm in height as measured by AFM per 10,000 µm² of magnetic layer surface (referred to as "AFM protrusion number", hereinafter) falls within the above range, the frequency of collision between the MR head element and protrusions decreases and damage to elements is reduced, thereby increasing head life. By reducing the frequency of collision, it is possible to suppress the occurrence of the phenomenon (smearing) whereby electrical short occurs due to the spreading of metal material constituting the magnetic head due to sliding contact with the head during signal reproduction. Further, since frictional force between the magnetic recording medium and the reproduction head decreases, it is possible to increase the durability of the medium. At an AFM protrusion number of less than 50, frictional force between the head and the medium increases excessively and the impact force on the head increases, resulting in shorter head life and decreased durability of the medium. A high frictional force between the head and the medium increases the amount of material adhering to the head, thereby creating problems by promoting smearing and element corrosion during storage. When the AFM protrusion number is greater than 2,500, an increase in the frequency in collisions between the MR head element and protrusions results in marked head abrasion and smearing. The above-described AFM protrusion number preferably ranges from 100 to 2,500, more preferably from 100 to 1,500, and further preferably, from 300 to 1,500.

In the magnetic recording medium, in addition to satisfying (1) above, the quantity of lubricant on the magnetic layer surface ranges from 0.5 to 5.0 as a surface lubricant index. When the magnetic layer surface lubricant index is less than 0.5 or greater than 5.0, the frictional force between the head and the medium during running increases and the impact force on the head increases, causing head abrasion, diminished medium durability, and marked smearing.

Furthermore, surprisingly, the research conducted by the present inventors resulted in the discovery that by controlling the magnetic layer surface lubricant index to within the above-stated range, it was possible to prevent the element corrosion of a spin-valve MR head in a sliding contact system. This was thought to occur because sliding contact between the reproduction head and the medium during running caused the lubricant on the magnetic layer surface to be transferred to the head surface, where it then played a role in preventing corrosion during storage. This can prevent corrosion of the element during storage in spin-valve MR heads lacking a DLC film for protection against corrosion and in spin-valve MR heads in which the DLC film had been eliminated by sliding contact between the head and the medium. The magnetic layer surface lubricant index preferably falls within a range of 0.5 to 4.0, more preferably 1.0 to 3.5, and further preferably, 1.5 to 3.0.

In the magnetic recording medium, in addition to satisfying (1) and (2) above, the surface abrasive occupancy of the magnetic layer ranges from 2 to 20 percent. By controlling the quantity of lubricant on the magnetic layer surface and the surface abrasive occupancy while keeping the AFM protrusion number on the magnetic layer surface to within the above-stated range, it is possible both to prevent an increase in the frictional force between the head and the medium during running, to ensure good running stability, and to suppress smearing. At a surface abrasive occupancy of the magnetic layer of less than 2 percent, the scratch resistance of the medium decreases, compromising the durability of the medium. This results in damage to the head, reduces head life, and promotes smearing. When the surface abrasive occupancy of the magnetic layer is greater than 20 percent, there is considerable damage to the MR head element, shortening head life. Further, the medium tends to be shaved down and more matter tends to adhere to the head, resulting in smearing and promoting element corrosion during storage. Excessively high abrasion is another cause of smearing. The surface abrasive occupancy of the magnetic layer preferably ranges from 3 to 18 percent, more preferably 4 to 15 percent, and further preferably, 5 to 12 percent.

As set forth above, by satisfying all of (1) to (3) above in the magnetic recording medium does it become possible to achieve good electromagnetic characteristics and running stability while ensuring an adequate head life in a magnetic signal reproduction system employing a spin-valve MR head as reproduction head. In this manner, it becomes possible to employ a spin-valve MR head as reproduction head in a sliding contact system, permitting an even higher degree of recording density.

Control methods and measurement methods for (1) to (3) above will be described below.

(1) AFM Protrusion Number

In the present invention, the number of protrusions equal to or greater than 10 nm in height per 10,000 $\mu m^2$ on the surface of the magnetic layer is measured by atomic force microscope (AFM). For example, this can be a value obtained by measuring at a resolution of 512×512 pixels the number of protrusions equal to or greater than 10 nm in height in a square measuring 30 µm on a side on the magnetic layer surface with an SiN probe in the form of a rectangular cone with an edge angle of 70 degrees using a Nanoscope 3 made by Digital Instruments Corp. and converting the measured value to the corresponding value for a square 100 µm on a side.

The AFM protrusion number can be controlled by one or any combination of the following methods:
- Adjusting the magnetic layer coating liquid dispersion conditions (dispersion retention time, particle size of the dispersion medium, and the like)
- Adjusting the particle size and quantity of particulate matter (such as carbon black and abrasive) added to the magnetic layer
- Adjusting the calendering conditions (such as the calendering temperature, processing rate, and pressure)
- Adjusting the method of preparing the magnetic layer coating liquid
- Adjusting the coating method when forming a nonmagnetic layer between the nonmagnetic support and the magnetic layer.

(2) The Quantity of Lubricant on the Surface of the Magnetic Layer

In the present invention, the surface lubricant index of the magnetic layer surface is an indicator of the quantity of lubricant present on the magnetic layer surface, and can be measured by Auger electron spectroscopy. Auger electron spectroscopy permits the analysis of elements to a depth of several tens of Angstroms (several um) from the surface, making it possible to determine the elements present on the extreme outer layer and their stoichiometric relation. In the case of a magnetic recording medium, the quantity of elemental carbon measured by Auger electron spectroscopy corresponds to the quantity of lubricant and binder resin present on the medium surface. At the same time, the quantity of elemental iron measured by Auger electron spectroscopy corresponds to the quantity of magnetic material present on the medium surface. First, the ratio of the two, C/Fe (a), can be determined by Auger electron spectroscopy. The quantity of elemental carbon measured after removing the lubricant from the magnetic recording medium corresponds to the quantity of binder resin on the medium surface. The ratio with the quantity of elemental iron, C/Fe (b), can then be obtained by Auger electron spectroscopy. The surface lubricant index in the present invention is given by: {C/Fe (a)}/{C/Fe (b)}. The lubricant can be removed from the medium by immersing the medium in n-hexane, extracting and removing lubricant that is not adsorbed to the magnetic material, reacting the lubricant that is adsorbed to magnetic material with a silylating agent to obtain a derivative, and removing the derivative by extraction.

The quantity of lubricant on the surface of the magnetic layer can be controlled by one or any combination of the following methods:
- Adjusting the type and quantity of lubricant added
- Adjusting the quantity of binder in the magnetic layer and nonmagnetic layer
- Adjusting the calendering conditions
- Adjusting the dispersion conditions of the magnetic layer coating liquid
- Adjusting the coating method when forming a nonmagnetic layer between the nonmagnetic support and the magnetic layer.

(3) The Surface Abrasive Occupancy of the Magnetic Layer

In the present invention, the surface abrasive occupancy of the magnetic layer is a value obtained using a scanning electron microscope (FE-SEM) to pick up a reflected electron image at an acceleration voltage of 2 kV, an operating distance of 3 mm, and a pick-up magnification of 20,000-fold as a 1024×764 pixel TIFF file at a resolution of 70 pixels/inch, converting this file to binary using an image analyzer in the form of a KS400 Ver. 3.0 made by Carl Zeiss, Inc., and calculating the ratio of the area occupied by abrasive relative to the total area.

The surface abrasive occupancy of the magnetic layer can be controlled by one or any combination of the following methods:
- Adjusting the particle size and quantity of abrasive added
- Adjusting the coating method when forming a nonmagnetic layer between the nonmagnetic support and the magnetic layer
- The method of dispersing the abrasive and the method of mixing it with the magnetic layer coating liquid.

The above adjustment methods will be specifically described below.

(a) Adjusting the Magnetic Layer Coating Liquid Dispersion Conditions (Dispersion Retention Time, Particle Size of the Dispersion Medium, and the Like)

The dispersion retention time depends on the peripheral speed of the tips of the dispersing device and the packing rate of the dispersion medium, and is, for example, 0.5 to 10 hours, preferably 1 to 7 hours, and more preferably, 2 to 5 hours. The peripheral speed of the tips of the dispersing device is preferably 5 to 20 m/s, more preferably 7 to 15 m/s. The dispersion medium employed is preferably zirconia beads, the particle size of which is preferably 0.1 to 1 mm, more preferably 0.1 to 0.5 mm. The packing rate of the dispersion medium can be 30 to 80 percent, preferably 50 to 80 percent. In the present invention, the packing rate is given as a volumetric standard. The more intense the dispersion, the greater the decrease in the AFM protrusion number of the magnetic layer surface tends to be. Further, intensifying dispersion tends to increase the quantity of lubricant on the magnetic layer surface by reducing voids in the magnetic layer. In the present invention, it is preferable to take the above factors into account when determining dispersion conditions.

(b) Adjusting the Particle Size and Quantity of Particulate Matter (Such as Carbon Black and Abrasive) Added to the Magnetic Layer The mean particle size of the carbon black in the magnetic layer is, for example, 10 to 200 nm, preferably 50 to 150 nm, and more preferably, 70 to 120 nm. The quantity of carbon black in the magnetic layer is preferably 0.1 to 5 weight parts, more preferably 0.5 to 2 weight parts, per 100 weight parts of ferromagnetic powder. The mean particle diameter of abrasive in the magnetic layer is, for example, 10 to 150 nm, preferably 30 to 150 nm, and more preferably, 50 to 120 nm. The quantity of abrasive in the magnetic layer is preferably 1 to 20 weight parts, more preferably 3 to 15 weight parts, per 100 weight parts of ferromagnetic powder. The carbon black and abrasive in the magnetic layer will be described in detail further below. The AFM protrusion number on the magnetic layer surface can be controlled by means of the particle diameter and quantity of carbon black added to the magnetic layer. Further, the AFM protrusion number on the magnetic layer surface and the surface abrasive occupancy of the magnetic layer can be adjusted by means of the particle diameter and quantity of abrasive added to the magnetic layer.

(c) Adjusting the Calendering Conditions (Such as the Calendar Temperature, Processing Rate, and Pressure)

Examples of calendering conditions are the type and number of calendar rolls, the calendering pressure, the calendering temperature, and the calendering speed. The more the calendering is intensified, the greater the smoothness of the magnetic layer surface and the greater the reduction in the AFM protrusion number tend to be. The calendering pressure is, for example, 200 to 500 kN/m, preferably 250 to 350 kN/m. The calendering temperature is, for example, 70 to 120° C., preferably 80 to 100° C. The calendering speed is, for example, 50 to 300 m/min, preferably 100 to 200 m/min. The harder the surface of the calendar rolls employed, and the greater the number of calendar rolls employed, the smoother the magnetic layer surface tends to be, so the AFM protrusion number can be adjusted by means of the combination and number of calendar rolls. The more the calendering is intensified, the greater the reduction in voids in the extreme outer surface of the magnetic layer, the greater the suppression of the supply of lubricant to the magnetic layer surface, and the smaller the quantity of surface lubricant tend to be. In the present invention, it is preferable to take the above factors into account when determining the calendering conditions.

(d) Adjusting the Method of Preparing the Magnetic Layer Coating Liquid

Since aggregation of particulate matter in the magnetic layer coating liquid causes the formation of large protrusions, readily aggregating particulate matter is preferably separately dispersed. For example, separately dispersing particulate matter in the form of abrasive and/or carbon black and then adding it to the coating liquid of the magnetic layer can both reduce the number of large protrusions on the magnetic layer surface and increase the number of minute protrusions on the magnetic layer surface.

(e) Adjusting the Coating Method when Forming a Nonmagnetic Layer Between the Nonmagnetic Support and the Magnetic Layer The AFM protrusion number can be controlled by (i) a successive layering coating (wet-on-dry) in which the nonmagnetic layer coating liquid is coated and dried, and then the magnetic layer coating liquid is coated, and (ii) by means of a nonmagnetic layer forming method in (i) above (adjusting the coating method, calendering, thermal processing, or the like). Further, since less liquid is coated during coating the magnetic layer in the wet-on-dry coating method, in which the magnetic layer coating liquid is coated after drying the nonmagnetic layer coating liquid, than in the wet-on-wet coating method, the drying speed is extremely fast, the substance displacement rate in the magnetic liquid tends to be rapid, and the sinking of surface abrasive into the magnetic layer during calendering is prevented. Thus, in the wet-on-dry coating method, the surface abrasive occupancy tends to be high. In the wet-on-dry method, the migration of lubricant between the magnetic layer and the nonmagnetic layer during drying is suppressed and the effect of the quantity of lubricant added to the magnetic layer coating liquid on the surface lubricant index is increased. By first drying the nonmagnetic layer coating liquid and then coating the magnetic layer coating liquid, the drying rate of the magnetic layer coating liquid increases, achieving substance displacement rates not possible with wet-on-wet coating method. Thus, the use of the wet-on-dry coating method is efficient for controlling the surface lubricant index.

The surface abrasive occupancy and the surface lubricant index can also be controlled by means of the coating thickness of the nonmagnetic layer, whether or not calendering is conducted following coating nonmagnetic layer, the conditions employed in calendering when conducted, whether or not thermal processing of the material is conducted following coating the nonmagnetic layer, and the conditions employed in thermal processing when conducted.

(f) Adjusting the Type and Quantity of Lubricant Added to the Magnetic Layer and Nonmagnetic Layer The types and quantities of lubricant added to the magnetic layer and nonmagnetic layer can be set, for example, by referencing the description given in Japanese Unexamined Patent Publication (KOKAI) No. 2003-132516 or English language family member US 2003/0157372 A1. The contents of these applications are incorporated herein by reference in their entirety. Since the migration of lubricant between the nonmagnetic layer and the magnetic layer can be suppressed during drying when employing a wet-on-dry coating method, it becomes possible to design separate lubricant types and addition quantities for each layer. For example, it is required to increase the quantity of lubricant added to both the magnetic layer and nonmagnetic layer in view of lubricant migration during drying, in order to increase the surface lubricant index in wet-on-wet coating. In that case, plasticization of the entire coating sometimes advances and coating strength sometimes decreases. By contrast, in wet-on-dry coating, the migration of lubricant between the magnetic layer and the nonmagnetic layer can be suppressed, permitting an increase in just the quantity of lubricant added to the magnetic layer coating liquid to increase the surface lubricant index and preventing a decrease in the strength of the coating as a whole.

(g) Adjusting the Quantity of Binder in the Magnetic Layer and Nonmagnetic Layer The quantity of lubricant present on the surface can be controlled through the compatibility of the binder in which the lubricant and magnetic powder are dispersed, as described in Japanese Unexamined Patent Publication (KOKAI) No. 2003-132516. The use of wet-on-dry coating can increase the degree of freedom in selecting the type and quantity of binder added to the magnetic layer and nonmagnetic layer with regard to this factor, as well. For example, in wet-on-wet coating, due to the deterioration of surface properties caused by the difference in drying contraction of the magnetic layer and nonmagnetic layer, it is generally difficult to design the binder structure and addition quantities so as to greatly differ in the two layers. By contrast, the deterioration of surface properties set forth above can be avoided with a wet-on-dry coating method, so it becomes possible to emphasize the dispersion properties of the powder in the nonmagnetic layer coating liquid by increasing the quantity of binder added, and to set the binder quantity in the magnetic layer coating liquid by taking into account the surface lubricant and dispensability.

The magnetic recording medium comprised in the magnetic signal reproduction system of the present invention or employed in the magnetic signal reproduction method of the present invention will be described in detail below.

Magnetic Layer

The magnetic recording medium comprises a magnetic layer comprising a ferromagnetic powder and a binder. Hexagonal ferrite powder and ferromagnetic metal powder are examples of the ferromagnetic powder comprised in the magnetic layer. Generally, hexagonal ferrite powder is harder and less prone to plastic deformation than ferromagnetic metal powder. A magnetic layer containing hexagonal ferrite powder also tends to have a smaller area of contact with the head than a magnetic layer containing ferromagnetic powder. By increasing the hardness and reducing the contact area of the magnetic layer surface, it is possible to keep the initial frictional force during running (initial frictional force) low. By keeping the initial frictional force low, it is possible to suppress change in the frictional force (an increase in µ value) due to repeated running. Thus, the use of hexagonal ferrite powder is advantageous from the perspective of ensuring running stability.

Examples of hexagonal ferrite powders suitable for use in the present invention are barium ferrite, strontium ferrite, lead ferrite, calcium ferrite, and various substitution products thereof, and Co substitution products. Specific examples are magnetoplumbite-type barium ferrite and strontium ferrite; magnetoplumbite-type ferrite in which the particle surfaces are covered with spinals; and magnetoplumbite-type barium ferrite, strontium ferrite, and the like partly comprising a spinal phase. The following may be incorporated into the hexagonal ferrite powder in addition to the prescribed atoms: Al, Si, S, Nb, Sn, Ti, V, Cr, Cu, Y, Mo, Rh, Pd, Ag, Sn, Sb, Te, W, Re, Au, Bi, La, Ce, Pr, Nd, P, Co, Mn, Zn, Ni, B, Ge, Nb and the like. Compounds to which elements such as Co—Zn, Co—Ti, Co—Ti—Zr, Co—Ti—Zn, Ni—Ti—Zn, Nb—Zn—Co, Sn—Zn—Co, Sn—Co—Ti and Nb—Zn have been added may generally also be employed. They may comprise specific impurities depending on the starting materials and manufacturing methods employed. The mean plate diameter preferably ranges from 10 to 50 nm, more preferably 10 to 30 nm, further preferably 15 to 25 nm. Particularly when employing an MR head in reproduction to increase a track density, a plate diameter equal to or less than 50 nm is desirable to reduce noise. A mean plate diameter equal to or higher than 10 nm yields stable magnetization without the effects of thermal fluctuation. A mean plate diameter equal to or less than 50 nm permits low noise and is suited to the high-density magnetic recording. The mean plate thickness preferably ranges from 4 to 15 nm. Consistent production is possible when the mean plate thickness is equal to or higher than 4 nm and adequate orientation can be obtained when the mean plate thickness is equal to or less than 15 nm.

The plate ratio (plate diameter/plate thickness) of the hexagonal ferrite powder preferably ranges from 1 to 15, more preferably from 1 to 7. Low plate ratio is preferable to achieve high filling property of the magnetic layer, but some times adequate orientation is not achieved. When the plate ratio is higher than 15, noise may be increased due to stacking between particles. The specific surface area by BET method of the hexagonal ferrite powders having such particle sizes ranges from 30 to 200 $m^2/g$, almost corresponding to an arithmetic value from the particle plate diameter and the plate thickness. Narrow distributions of particle plate diameter and thickness are normally good. Although difficult to render in number form, about 500 particles can be randomly measured in a transmission electron microscope (TEM) photograph of particles to make a comparison. This distribution is often not a normal distribution. However, when expressed as the standard deviation to the average particle size, a/average particle size=0.1 to 1.5. The particle producing reaction system is rendered as uniform as possible and the particles produced are subjected to a distribution-enhancing treatment to achieve a narrow particle size distribution. For example, methods such as selectively dissolving ultrafine particles in an acid solution by dissolution are known. According to a vitrified crystallization method, powders with increased uniformity can be obtained by conducting several thermal treatments to separate crystal nucleation and growth.

A coercivity (Hc) of the hexagonal ferrite powder of about 40 to 398 kA/m can normally be achieved. A high coercivity (Hc) is advantageous for high-density recording, but this is limited by the capacity of the recording head. The coercivity (Hc) can be controlled by particle size (plate diameter and plate thickness), the types and quantities of elements contained, substitution sites of the element, the particle producing reaction conditions, and the like. The saturation magnetization ($\sigma_s$) can be 30 to 70 $A \cdot m^2/kg$ and it tends to decrease with decreasing particle size. Known methods of improving saturation magnetization ($\sigma_s$) are lowering crystallization temperature or thermal treatment temperature, shortening thermal treatment time, increasing the amount of compound added, enhancing the level of surface treatment and the like. It is also possible to employ W-type hexagonal ferrite. When dispersing the hexagonal ferrite, the surface of the hexagonal ferrite powder can be processed with a substance suited to a dispersion medium and a polymer. Both organic and inorganic compounds can be employed as surface treatment agents. Examples of the principal compounds are oxides and hydroxides of Si, Al, P, and the like; various silane coupling agents; and various titanium coupling agents. The quantity of surface treatment agent added can range from 0.1 to 10 weight percent relative to the weight of the hexagonal ferrite powder. The pH of the hexagonal ferrite powder is also important to dispersion. A pH of about 4 to 12 is usually optimum for the dispersion medium and polymer. From the perspective of the chemical stability and storage properties of the medium, a pH of about 6 to 11 can be selected. Moisture contained in the hexagonal ferrite powder also affects dispersion. There is an optimum level for the dispersion medium and polymer, usually selected from the range of 0.1 to 2.0 weight percent.

Methods of manufacturing the hexagonal ferrite include: (1) a vitrified crystallization method consisting of mixing into a desired ferrite composition barium carbonate, iron oxide, and a metal oxide substituting for iron with a glass forming substance such as boron oxide; melting the mixture; rapidly cooling the mixture to obtain an amorphous material; reheating the amorphous material; and refining and comminuting the product to obtain a barium ferrite crystal powder; (2) a hydrothermal reaction method consisting of neutralizing a barium ferrite composition metal salt solution with an alkali; removing the by-product; heating the liquid phase to 100° C. or greater; and washing, drying, and comminuting the product to obtain barium ferrite crystal powder; and (3) a coprecipitation method consisting of neutralizing a barium ferrite composition metal salt solution with an alkali; removing the by-product; drying the product and processing it at equal to or less than 1,100° C.; and comminuting the product to obtain barium ferrite crystal powder. Any manufacturing method can be selected in the present invention.

The ferromagnetic metal powder is preferably a ferromagnetic metal power comprised primarily of a-Fe. In addition to prescribed atoms, the following atoms can be contained in the ferromagnetic metal powder: Al, Si, Ca, Mg, Ti, Cr, Cu, Y, Sn, Sb, Ba, W, La, Ce, Pr, Nd, P, Co, Mn, Zn, Ni, Sr, B and the like.

Particularly, incorporation of at least one of the following in addition to α-Fe is desirable: Al, Ca, Mg, Y, Ba, La, Nd, Sm, Co and Ni. Incorporation of Co is particularly preferred because saturation magnetization increases and demagnetization is improved when Co forms an alloy with Fe. The Co content preferably ranges from 1 to 40 atom percent, more preferably from 15 to 35 atom percent, further preferably from 20 to 35 atom percent with respect to Fe. The content of rare earth elements such as Y preferably ranges from 1.5 to 12 atom percent, more preferably from 3 to 10 atom percent, further preferably from 4 to 9 atom percent with respect to Fe. The Al content preferably ranges from 1.5 to 12 atom percent, more preferably from 3 to 10 atom percent, further preferably from 4 to 9 atom percent with respect to Fe. Al and rare earth elements including Y function as sintering preventing agents, making it possible to achieve a greater sintering prevention effect when employed in combination. These ferromagnetic metal powders may be pretreated prior to dispersion with dispersing agents, lubricants, surfactants, antistatic agents, and the like, described further below. Specific examples are described in Japanese Examined Patent Publication (KOKOKU) Showa Nos. 44-14090, 45-18372, 47-22062, 47-22513, 46-28466, 46-38755, 47-4286, 47-12422, 47-17284, 47-18509, 47-18573, 39-10307, and 46-39639; and U.S. Pat. Nos. 3,026,215, 3,031,341, 3,100,194, 3,242,005, and 3,389,014. The contents of these applications are incorporated herein by reference in their entirety.

The ferromagnetic metal powder may contain a small quantity of hydroxide or oxide. Ferromagnetic metal powders obtained by known manufacturing methods may be employed. The following are examples of methods of manufacturing ferromagnetic metal powders: methods of reducing hydroscopic iron oxide subjected to sintering preventing treatment or iron oxide with a reducing gas such as hydrogen to obtain Fe or Fe—Co particles or the like; methods of reduction with compound organic acid salts (chiefly oxalates) and reducing gases such as hydrogen; methods of thermal decomposition of metal carbonyl compounds; methods of reduction by addition of a reducing agent such as sodium boron hydride, hypophosphite, or hydrazine to an aqueous solution of ferromagnetic metal; and methods of obtaining powder by vaporizing a metal in a low-pressure inert gas. The ferromagnetic metal powders obtained in this manner may be subjected to any of the known slow oxidation treatments. The method of reducing hydroscopic iron oxide or iron oxide with a reducing gas such as hydrogen and forming an oxide coating on the surface thereof by adjusting a partial pressure of oxygen-containing gas and inert gas, temperature and time is preferred because of low demagnetization.

The ferromagnetic metal powder preferably has a specific surface area (SBET) by BET method of 40 to 80 $m^2/g$, more preferably 45 to 70 $m^2/g$. When the specific surface area by BET method is 40 $m^2/g$ or more, noise drops, and at 80 $m^2/g$ or less, surface smoothness are good. The crystallite size of the ferromagnetic metal powder is preferably 8 to 18 nm, more preferably 10 to 17 nm, and further preferably, 11 to 16.5 nm. The mean major axis length of the ferromagnetic metal powder preferably ranges from 25 to 100 nm, more preferably 25 to 50 nm, further preferably 25 to 40 nm. When the mean major axis length is 25 nm or more, magnetization loss due to thermal fluctuation does not occur, and at 100 nm or less, deterioration of error rate due to increased noises can be avoided. The mean acicular ratio {mean of (major axis length/minor axis length)} of the ferromagnetic metal powder preferably ranges from 3 to 15, more preferably from 3 to 10. The saturation magnetization ($\sigma_s$) of the ferromagnetic metal powder preferably ranges from 90 to 170 A·$m^2$/kg, more preferably from 100 to 160 A·$m^2$/kg, and further preferably from 110 to 160 A·$m^2$/kg. The coercivity of the ferromagnetic metal powder preferably ranges from 135 to 279 kA/m, more preferably from 142 to 239 kA/m.

The moisture content of the ferromagnetic metal powder preferably ranges from 0.1 to 2 weight percent; the moisture content of the ferromagnetic metal powder is desirably optimized depending on the type of binder. The pH of the ferromagnetic metal powder is desirably optimized depending on the combination with the binder employed; the range is normally pH 6 to 12, preferably pH 7 to 11. The stearic acid (SA) adsorption capacity (that is a measure of surface basicity) of the ferromagnetic powder preferably ranges from 1 to 15 μmol/$m^2$, more preferably from 2 to 10 μmol/$m^2$, further preferably from 3 to 8 μmol/$m^2$. When employing a ferromagnetic metal powder of which stearic acid adsorption capacity is high, the surface of the ferromagnetic metal powder is desirably modified with organic matter strongly adsorbed to the surface to manufacture a magnetic recording medium. An inorganic ion in the form of soluble Na, Ca, Fe, Ni, Sr, $NH_4$, $SO_4$, Cl, $NO_2$, $NO_3$ or the like may be contained in the ferromagnetic metal powder. These are preferably substantially not contained, but at levels of equal to or less than 300 ppm, characteristics are seldom affected. Further, the ferromagnetic metal powder employed in the present invention desirably has few pores. The content of pores is preferably equal to or less than 20 volume percent, more preferably equal to or less than 5 volume percent. So long as the above-stated particle size and magnetic characteristics are satisfied, the particles may be acicular, rice-particle shaped, or spindle-shaped. The shape is particularly preferably acicular. The magnetic recording medium with low SFD (switching-field distribution) is suited to high-density digital magnetic recording because magnetization switching is sharp and peak shifts are small. It is preferable to narrow the Hc distribution of the ferromagnetic metal powder. A low Hc distribution can be achieved, for example, by improving the goethite particle size distribution, by employing monodisperse α-$Fe_2O_3$, and by preventing sintering between particles and the like in the ferromagnetic metal powder.

Examples of types of carbon black that are suitable for use in the magnetic layer are: furnace black for rubber, thermal for rubber, black for coloring, conductive carbon and acetylene black. A specific surface area of 5 to 500 $m^2/g$, a DBP oil absorption capacity of 10 to 400 m/100 g, a pH of 2 to 10 and a moisture content of 0.1 to 10 weight percent and a tap density of 0.1 to 1 g/cc are respectively desirable. As set forth above, a mean particle size of 10 to 200 nm is desirable. Specific examples of types of carbon black employed in the magnetic layer are: BLACK PEARLS 2000, 1300, 1000, 900, 905, 800, 700 and VULCAN XC-72 from Cabot Corporation; #80, #60, #55, #50 and #35 manufactured by Asahi Carbon Co., Ltd.; #2400B, #2300, #900, #1000, #30, #40 and #10B from Mitsubishi Chemical Corporation; CONDUCTEX SC, RAVEN 150, 50, 40, 15 and RAVEN MT-P from Columbia Carbon Co., Ltd.; and Ketjen Black EC from Lion Akzo Co., Ltd. The carbon black employed may be surface-treated with a dispersant or grafted with resin, or have a partially graphite-treated surface. The carbon black may be dispersed in advance into the binder prior to addition to the magnetic layer coating liquid. These carbon blacks may be used singly or in combination. When employing carbon black, the quantity of carbon black comprised in the magnetic layer preferably ranges from 0.1 to 5 weight parts per 100 weight parts of the ferromagnetic powder, as set forth above. In the magnetic layer, carbon black works to prevent static, reduce the coefficient of friction, impart light-blocking properties, enhance film strength, and the like; the properties vary with the type of carbon black employed. Accordingly, in order to achieve desired characteristics, it is preferred that the type and the quantity of carbon black employed in the present invention are selected based on the various characteristics stated above, such as particle size, oil absorption capacity, electrical conductivity, and pH. For example, *Carbon Black Handbook* compiled by the Carbon Black Association, which is expressly incorporated herein by reference in its entirety, may be consulted for types of carbon black suitable for use in the present invention.

Known materials chiefly having a Mohs' hardness of equal to or greater than 6 may be employed either singly or in combination as abrasives. These include: α-alumina with an α-conversion rate of equal to or greater than 90 percent, β-alumina, silicon carbide, chromium oxide, cerium oxide, α-iron oxide, corundum, synthetic diamond, silicon nitride, silicon carbide, titanium carbide, titanium oxide, silicon dioxide, and boron nitride. A magnetic layer with high coating strength can be formed by using the abrasive having a Mohs' hardness of equal to or greater than 6, achieving adequate running durability. By employing the abrasive with higher Mohs' hardness, the magnetic layer with higher coating strength can be formed and desired characteristics can be achieved even with a small quantity added. The Mohs' hardness of the abrasive is preferably equal to or higher than 8, more preferably equal to or higher than 9, and most preferably, the maximum value, 10. Complexes of these abrasives (obtained by surface treating one abrasive with another) may also be employed. There are cases in which compounds or elements other than the primary compound are contained in these abrasives; the effect does not change so long as the content of the primary compound is equal to or greater than 90 percent. The particle size of the abrasive is, as a mean particle diameter, for example, 10 to 150 nm, preferably 30 to 150 nm, and more preferably, 50 to 120 nm, as set forth above. To enhance electromagnetic characteristics, a narrow particle size distribution is desirable. Abrasives of differing particle size may be incorporated as needed to improve durability; the same effect can be achieved with a single abrasive as with a wide particle size distribution. It is preferable that the tap density is 0.3 to 2 g/cc, the moisture content is 0.1 to 5 percent, the pH is 2 to 11, and the specific surface area is 1 to 30 $m^2/g$. The shape of the abrasive employed in the present invention may be acicular, spherical, cubic, or the like. However, a shape comprising an angular portion is desirable due to high abrasiveness. Specific examples are AKP-12, AKP-15, AKP-20, AKP-30, AKP-50, HIT-20, HIT-30, HIT-55, HIT-60, HIT-70, HIT-80, and HIT-100 made by Sumitomo Chemical Co., Ltd.; ERC-DBM, HP-DBM, and HPS-DBM made by Reynolds Corp.; WA10000 made by Fujimi Abrasive Corp.; UB20 made by Uemura Kogyo Corp.; G-5, Chromex U2, and Chromex U1 made by Nippon Chemical Industrial Co., Ltd.; TF100 and TF140 made by Toda Kogyo Corp.; Beta Random Ultrafine made by Tbiden Co., Ltd.; and B-3 made by Showa Kogyo Co., Ltd. These abrasives may be added as needed to the nonmagnetic layer. Addition of abrasives to the nonmagnetic layer can be done to control surface shape, control how the abrasive protrudes, and the like. The particle size and quantity of the abrasives added to the magnetic layer and nonmagnetic layer should be set to optimal values.

Conventionally known thermoplastic resins, thermosetting resins, reactive resins and mixtures thereof may be employed as binders used in the magnetic layer. The thermoplastic resins suitable for use have a glass transition temperature of −100 to 150° C., a number average molecular weight of 1,000 to 200,000, preferably from 10,000 to 100,000, and have a degree of polymerization of about 50 to 1,000. Examples thereof are polymers and copolymers comprising structural units in the form of vinyl chloride, vinyl acetate, vinyl alcohol, maleic acid, acrylic acid, acrylic acid esters, vinylidene chloride, acrylonitrile, meth acrylic acid, meth acrylic acid esters, styrene, butadiene, ethylene, vinyl butyral, vinyl acetal, and vinyl ether; polyurethane resins; and various rubber resins. Further, examples of thermosetting resins and reactive resins are phenol resins, epoxy resins, polyurethane cured resins, urea resins, melamine resins, alkyd resins, acrylic reactive resins, formaldehyde resins, silicone resins, epoxy polyamide resins, mixtures of polyester resins and isocyanate prepolymers, mixtures of polyester polyols and polyisocyanates, and mixtures of polyurethane and polyisocyanates. These resins are described in detail in *Handbook of Plastics* published by Asakura Shoten, which is expressly incorporated herein by reference in its entirety. It is also possible to employ known electron beam-cured resins. Examples and manufacturing methods of such resins are described in Japanese Unexamined Patent Publication (KOKAI) Showa No. 62-256219, which is expressly incorporated herein by reference in its entirety. The above-listed resins may be used singly or in combination. Preferred resins are combinations of polyurethane resin and at least one member selected from the group consisting of vinyl chloride resin, vinyl chloride-vinyl acetate copolymers, vinyl chloride-vinyl acetate-vinyl alcohol copolymers, and vinyl chloride-vinyl acetate-maleic anhydride copolymers, as well as combinations of the same with polyisocyanate.

Known structures of polyurethane resin can be employed, such as polyester polyurethane, polyether polyurethane, polyether polyester polyurethane, polycarbonate polyurethane, polyester polycarbonate polyurethane, and polycaprolactone polyurethane. To obtain better dispersibility and durability in all of the binders set forth above, it is desirable to introduce by copolymerization or addition reaction one or more polar groups selected from among —COOM, —$SO_3M$, —$OSO_3M$, —P=$O(OM)_2$, —O—P=$O(OM)_2$ (where M denotes a hydrogen atom or an alkali metal base), —OH, —$NR_2$, —$N^+R_3$ (where R denotes a hydrocarbon group), epoxy groups, —SH, and —CN. The quantity of the polar group can be from $10^{-1}$ to $10^{-8}$ mol/g, preferably from $10^{-2}$ to $10^{-6}$ mol/g.

Specific examples of the binders employed in the present invention are VAGH, VYHH, VMCH, VAGF, VAGD, VROH, VYES, VYNC, VMCC, XYHL, XYSG, PKHH, PKHJ, PKHC, and PKFE from Union Carbide Corporation; MPR-TA, MPR-TA5, MPR-TAL, MPR-TSN, MPR-TMF, MPR-TS, MPR-TM, and MPR-TAO from Nisshin Kagaku Kogyo K. K.; 1000W, DX80, DX81, DX82, DX83, and 1OOFD from Denki Kagaku Kogyo K. K.; MR-104, MR-105, MR110, MR100, MR555, and 400X-110A from Nippon Zeon Co., Ltd.; Nippollan N2301, N2302, and N2304 from Nippon Polyurethane Co., Ltd.; Pandex T-5105, T-R3080, T-5201, Burnock D-400, D-210-80, Crisvon 6109, and 7209 from Dainippon Ink and Chemicals Incorporated.; Vylon UR8200, UR8300, UR-8700, RV530, and RV280 from Toyobo Co., Ltd.; Daipheramine 4020, 5020, 5100, 5300, 9020, 9022, and 7020 from Dainichiseika Color & Chemicals Mfg. Co., Ltd.; MX5004 from Mitsubishi Chemical Corporation; Sanprene SP-150 from Sanyo Chemical Industries, Ltd.; and Saran F310 and F210 from Asahi Chemical Industry Co., Ltd.

To control the surface lubricant index in the present invention, the type and quantity of the binder added is preferably adjusted in view of the compatibility of the binder in which the lubricant and magnetic powder are dispersed, as described in Japanese Unexamined Patent Publication (KOKAI) No, 2003-132516. When the compatibility is high, it is possible to reduce the quantity of the lubricant present on the surface by blending the lubricant into the inside of the magnetic layer. Conversely, the quantity of the lubricant present on the surface can be increased when the compatibility is low. Thus, it is preferable to optimize the type of the lubricant, type of the binder, mixing ratio of the binder resin composition (the ratio of vinyl chloride-urethane resin-curing agent), the P/B ratio (the ratio of inorganic powder such as magnetic material and binder resin), and the like, from the perspective of the compatibility. The binder employed in the magnetic layer is normally employed in a range of 5 to 50 weight percent, preferably from 10 to 30 weight percent with respect to the ferromagnetic powder. Vinyl chloride resin, polyurethane resin, and polyisocyanate are preferably combined within the ranges of: 5 to 30 weight percent for vinyl chloride resin, when employed; 2 to 20 weight percent for polyurethane resin, when employed; and 2 to 20 weight percent for polyisocyanate. However, when a small amount of dechlorination causes head corrosion, it is also possible to employ polyurethane alone, or employ polyurethane and isocyanate alone. In the present invention, when polyurethane is employed, a glass transition temperature of −50 to 150° C., preferably 0 to 100° C., an elongation at break of 100 to 2,000 percent, a stress at break of 0.49 to 98 MPa, and a yield point of 0.49 to 98 MPa, are desirable.

Examples of polyisocyanates suitable for use in the present invention are tolylene diisocyanate, 4,4'-diphenylmethane diisocyanate, hexamethylene diisocyanate, xylylene diisocyanate, napthylene-1,5-diisocyanate, o-toluidine diisocyanate, isophorone diisocyanate, triphenylmethane triisocyanate, and other isocyanates; products of these isocyanates and polyalcohols; polyisocyanates produced by condensation of isocyanates; and the like. These isocyanates are commercially available under the following trade names, for example: Coronate L, Coronate HL, Coronate 2030, Coronate 2031, Millionate MR and Millionate MTL manufactured by Nippon Polyurethane Industry Co. Ltd.; Takenate D-102, Takenate D-110N, Takenate D-200 and Takenate D-202 manufactured by Takeda Chemical Industries Co., Ltd.; and Desmodule L, Desmodule IL, Desmodule N and Desmodule HL manufactured by Sumitomo Bayer Co., Ltd. They can be used singly or in combinations of two or more by exploiting differences in curing reactivity.

Substances having lubricating effects, antistatic effects, dispersive effects, plasticizing effects, or the like may be employed as additives in the magnetic layer. Examples of additives are: molybdenum disulfide; tungsten disulfide; graphite; boron nitride; graphite fluoride; silicone oils; silicones having a polar group; fatty acid-modified silicones; fluorine-containing silicones; fluorine-containing alcohols; fluorine-containing esters; polyolefins; polyglycols; alkylphosphoric esters and their alkali metal salts; alkylsulfuric esters and their alkali metal salts; polyphenyl ethers; phenylphosphonic acid; α-naphthylphosphoric acid; phenylphosphoric acid; diphenylphosphoric acid; p-ethylbenzenephosphonic acid; phenylphosphinic acid; aminoquinones; various silane coupling agents and titanium coupling agents; fluorine-containing alkylsulfuric acid esters and their alkali metal salts; monobasic fatty acids (which may contain an unsaturated bond or be branched) having 10 to 24 carbon atoms and metal salts (such as Li, Na, K, and Cu) thereof; monohydric, dihydric, trihydric, tetrahydric, pentahydric or hexahydric alcohols with 12 to 22 carbon atoms (which may contain an unsaturated bond or be branched); alkoxy alcohols with 12 to 22 carbon atoms; monofatty esters, difatty esters, or trifatty esters comprising a monobasic fatty acid having 10 to 24 carbon atoms (which may contain an unsaturated bond or be branched) and any one from among a monohydric, dihydric, trihydric, tetrahydric, pentahydric or hexahydric alcohol having 2 to 12 carbon atoms (which may contain an unsaturated bond or be branched); fatty acid esters of monoalkyl ethers of alkylene oxide polymers; fatty acid amides with 8 to 22 carbon atoms; and aliphatic amines with 8 to 22 carbon atoms.

Specific examples of the additives in the form of fatty acids are: capric acid, caprylic acid, lauric acid, myristic acid, palmitic acid, stearic acid, behenic acid, oleic acid, elaidic acid, linolic acid, linolenic acid, and isostearic acid. Examples of esters are butyl stearate, octyl stearate, amyl stearate, isooctyl stearate, butyl myristate, octyl myristate, butoxyethyl stearate, butoxydiethyl stearate, 2-ethylhexyl stearate, 2-octyldodecyl palmitate, 2-hexyldodecyl palmitate, isohexadecyl stearate, oleyl oleate, dodecyl stearate, tridecyl stearate, oleyl erucate, neopentylglycol didecanoate, and ethylene glycol dioleyl. Examples of alcohols are oleyl alcohol, stearyl alcohol, and lauryl alcohol. It is also possible to employ nonionic surfactants such as alkylene oxide-based surfactants, glycerin-based surfactants, glycidol-based surfactants and alkylphenolethylene oxide adducts; cationic surfactants such as cyclic amines, ester amides, quaternary ammonium salts, hydantoin derivatives, heterocycles, phosphoniums, and sulfoniums; anionic surfactants comprising acid groups, such as carboxylic acid, sulfonic acid, phosphoric acid, sulfuric ester groups, and phosphoric ester groups; and ampholytic surfactants such as amino acids, amino sulfonic acids, sulfuric or phosphoric esters of amino alcohols, and alkyl betaines. Details of these surfactants are described in *A Guide to Surfactants* (published by Sangyo Tosho K.K.), which is expressly incorporated herein by reference in its entirety. These lubricants, antistatic agents and the like need not be 100 percent pure and may contain impurities, such as isomers, unreacted material, by-products, decomposition products, and oxides in addition to the main components. These impurities are preferably comprised equal to or less than 30 weight percent, and more preferably equal to or less than 10 weight percent. The total lubricant amount is normally 0.1 to 10 weight percent, preferably 0.5 to 5 weight percent with respect to the ferromagnetic powder.

Nonmagnetic Layer

The magnetic recording medium comprised in the magnetic signal reproduction system of the present invention or employed in the magnetic signal reproduction method of the present invention may have a nonmagnetic layer comprising a nonmagnetic powder and a binder between the nonmagnetic support and a magnetic layer. The nonmagnetic powder comprised in the nonmagnetic layer can be selected from inorganic compounds such as metal oxides, metal carbonates, metal sulfates, metal nitrides, metal carbides, metal sulfides and the like. Examples of inorganic compounds are α-alumina having an α-conversion rate of 90 to 100 percent, β-alumina, γ-alumina, silicon carbide, chromium oxide, cerium oxide, α-iron oxide, corundum, silicon nitride, titanium carbide, titanium dioxide, silicon dioxide, tin oxide, magnesium oxide, tungsten oxide, zirconium oxide, boron nitride, zinc oxide, calcium carbonate, calcium sulfate, barium sulfate and molybdenum disulfide; these may be employed singly or in combination. Particularly desirable are titanium dioxide, zinc oxide, iron oxide and barium sulfate. Even more preferred is titanium dioxide.

The mean particle diameter of these nonmagnetic powders preferably ranges from 0.005 to 2 μm, but nonmagnetic powders of differing particle size may be combined as needed, or the particle diameter distribution of a single nonmagnetic powder may be broadened to achieve the same effect. What is preferred most is a mean particle diameter in the nonmagnetic powder ranging from 0.01 to 0.2 μm. The pH of the nonmagnetic powder particularly preferably ranges from 6 to 9. The specific surface area of the nonmagnetic powder preferably ranges from 1 to 100 m$^2$/g, more preferably from 5 to 50 m$^2$/g, further preferably from 7 to 40 m$^2$/g. The crystallite size of the nonmagnetic powder preferably ranges from 0.01 μm to 2 μm, the oil absorption capacity using dibutyl phthalate (DBP) preferably ranges from 5 to 100 mil/100 g, more preferably from 10 to 80 ml/100 g, farther preferably from 20 to 60 mil/100 g. The specific gravity preferably ranges from 1 to 12, more preferably from 3 to 6. The shape of the nonmagnetic powder may be any of acicular, spherical, polyhedral, or plate-shaped.

The surface of these nonmagnetic powders is preferably treated with $Al_2O_3$, $SiO_2$, $TiO_2$, $ZrO_2$, $SnO_2$, $Sb_2O_3$ and ZnO. The surface-treating agents of preference with regard to dispersibility are $Al_2O_3$, $SiO_2$, $TiO_2$ and $ZrO_2$, and $Al_2O_3$, $SiO_2$ and $ZrO_2$ are further preferable. These may be used singly or in combination. Depending on the objective, a surface-treatment coating layer with a coprecipitated material may also be employed, the coating structure which comprises a first alumina coating and a second silica coating thereover or the reverse structure thereof may also be adopted. Depending on the objective, the surface-treatment coating layer may be a porous layer, with homogeneity and density being generally desirable.

Carbon black can be added to the nonmagnetic layer. Mixing carbon black achieves the known effects of lowering surface electrical resistivity Rs and yielding the desired micro Vickers hardness. Examples of types of carbon black that are suitable for use are furnace black for rubber, thermal for rubber, black for coloring and acetylene black. The specific surface area of carbon black employed preferably ranges from 100 to 500 m$^2$/g, more preferably from 150 to 400 m$^2$/g, and the DBP oil absorption capacity preferably ranges from 20 to 400 ml/100 g, more preferably from 30 to 200 mil/100 g. The mean particle diameter of carbon black preferably ranges from 5 to 80 nm, more preferably from 10 to 50 nm, further preferably from 10 to 40 nm. It is preferable for carbon black that the pH ranges from 2 to 10, the moisture content ranges from 0.1 to 10 percent and the tap density ranges from 0.1 to 1 g/ml. Specific examples of types of carbon black suitable for use are: BLACK PEARLS 2000, 1300, 1000, 900, 800, 880, 700 and VULCAN XC-72 from Cabot Corporation; #3050B, #3150B, #3250B, #3750B, #3950B, #950, #650B, #970B, #850B and MA-600 from Mitsubishi Chemical Corporation; CONDUCTEX SC, RAVEN 8800, 8000, 7000, 5750, 5250, 3500, 2100, 2000, 1800, 1500, 1255 and 1250 from Columbia Carbon Co., Ltd.; and irony Ketjen Black EC from Lion Akzo Co., Ltd.

As regards binders, lubricants, dispersants, additives, solvents, dispersion methods and the like of the nonmagnetic layer, known techniques regarding magnetic layers can be applied. In particular, known techniques for magnetic layers regarding types and amounts of binders, additives and dispersants can be applied to the nonmagnetic layer.

The nonmagnetic layer can be formed by coating the nonmagnetic layer coating liquid prepared by the aforementioned materials onto a nonmagnetic support.

All or some of the additives used in the present invention may be added at any stage in the process of manufacturing the magnetic and nonmagnetic coating liquids. For example, they may be mixed with the ferromagnetic powder before a kneading step; added during a step of kneading the ferromagnetic powder, the binder, and the solvent; added during a dispersing step; added after dispersing; or added immediately before coating. Part or all of the additives may be applied by simultaneous or sequential coating after the magnetic layer has been applied to achieve a specific purpose. Depending on the objective, the lubricant may be coated on the surface of the magnetic layer after calendering or making slits. Known organic solvents may be employed in the present invention. For example, the solvents described in Japanese Unexamined Patent Publication (KOKAI) Showa No. 6-68453, which is expressly incorporated herein by reference in its entirety, may be employed.

Layer Structure

In the above magnetic recording medium, the thickness of the nonmagnetic support preferably ranges from 2 to 100 μm, more preferably from 2 to 80 μm. For computer-use magnetic recording tapes, the nonmagnetic support having a thickness of 3.0 to 6.5 μm, preferably 3.0 to 6.0 μm, more preferably 4.0 to 5.5 μm is suitably employed.

An undercoating layer may be provided to improve adhesion between the nonmagnetic support and the nonmagnetic layer or magnetic layer. The thickness of the undercoating layer can be made from 0.01 to 0.5 μm, preferably from 0.02 to 0.5 μm. The magnetic recording medium may be a disk-shaped medium in which a nonmagnetic layer and magnetic layer are provided on both sides of the nonmagnetic support, or may be a tape-shaped or disk-shaped magnetic recording medium having these layers on just one side. In the latter case, a backcoat layer may be provided on the opposite surface of the nonmagnetic support from the surface on which is provided the magnetic layer to achieve effects such as preventing static and compensating for curl. The thickness of the backcoat layer is, for example, from 0.1 to 4 μm, preferably from 0.3 to 2.0 μm. Known undercoating layers and backcoat layers may be employed.

In the magnetic recording medium, the thickness of the magnetic layer can be optimized based on the saturation magnetization of the head employed, the length of the head gap, and the recording signal band, and is preferably 10 to 150 nm, more preferably 2 to 100 nm. The magnetic layer may be divided into two or more layers having different magnetic characteristics, and a known configuration relating to multilayered magnetic layer may be applied.

The nonmagnetic layer is normally 0.2 to 5.0 μm, preferably 0.3 to 3.0 μm, and more preferably, 1.0 to 2.5 μm in thickness. The nonmagnetic layer exhibits its effect so long as it is substantially nonmagnetic. For example, the effect of the present invention is exhibited even when trace quantities of magnetic material are incorporated as impurities or intentionally incorporated, and such incorporation can be viewed as substantially the same configuration as the present invention.

Backcoat Layer

Generally, computer data recording-use magnetic tapes are required to have far better repeat running properties than audio and video tapes. Carbon black and inorganic powders are desirably incorporated into the backcoat layer to maintain high running durability.

Two types of carbon black of differing mean particle diameter are desirably combined for use. In this case, microparticulate carbon black with a mean particle diameter of 10 to 50 nm and coarse particulate carbon black with a mean particle diameter of 70 to 300 nm are desirably combined for use. Generally, the addition of such microparticulate carbon black makes it possible to set a lower surface electrical resistance and optical transmittance in the backcoat layer. Many magnetic recording devices exploit the optical transmittance of the tape in an operating signal. In such cases, the addition of microparticulate carbon black is particularly effective.

Microparticulate carbon black generally enhances liquid lubricant retentivity, contributing to a reduced coefficient of friction when employed with lubricants.

Examples of specific microparticulate carbon black products are given below and the mean particle diameter is given in parentheses: BLACK PEARLS 800 (17 nm), BLACK PEARLS 1400 (13 nm), BLACK PEARLS 1300 (13 nm), BLACK PEARLS 1100 (14 nm), BLACK PEARLS 1000 (16 nm), BLACK PEARLS 900 (15 nm), BLACK PEARLS 880 (16 nm), BLACK PEARLS 4630 (19 nm), BLACK PEARLS 460 (28 nm), BLACK PEARLS 430 (28 nm), BLACK PEARLS 280 (45 nm), MONARCH 800 (17 nm), MONARCH 14000 (13 nm), MONARCH 1300 (13 nm), MONARCH 1100 (14 nm), MONARCH 1000 (16 nm), MONARCH 900 (15 nm), MONARCH 880 (16 nm), MONARCH 630 (19 nm), MONARCH 430 (28 nm), MONARCH 280 (45 nm), REGAL 330 (25 nm), REGAL 250 (34 nm), REGAL 99 (38 nm), REGAL 400 (25 nm) and REGAL 660 (24 nm) from Cabot Corporation; RAVEN2000B (18 nm), RAVEN1500B (17 nm), Raven 7000 (11 nm), Raven 5750 (12 nm), Raven 5250 (16 nm), Raven 3500 (13 nm), Raven 2500 ULTRA (13 nm), Raven 2000 (18 nm), Raven 1500 (17 nm), Raven 1255 (21 nm), Raven 1250 (20 nm), Raven 1190 ULTRA (21 nm), Raven 1170 (21 nm), Raven 1100 ULTRA (32 nm), Raven 1080 ULTRA (28 nm), Raven 1060 ULTRA (30 nm), Raven 1040 (28 nm), Raven 880 ULTRA (30 nm), Raven 860 (39 nm), Raven 850 (34 nm), Raven 820 (32 nm), Raven 790 ULTRA (30 nm), Raven 780 ULTRA (29 nm) and Raven 760 ULTRA (30 nm) from Columbia Carbon Co., Ltd.; Asahi #90 (19 nm), Asahi #80 (22 nm), Asahi #70 (28 nm), Asahi F-200 (35 nm), Asahi #60HN (40 nm), Asahi #60 (45 nm), HS-500 (38 nm) and Asahi #51 (38 nm) from Asahi Carbon Co., Ltd.; #2700 (13 nm), #2650 (13 nm), #2400 (14 nm), #1000 (18 nm), #950 (16 nm), #850 (17 nm), #750 (22 nm), #650 (22 nm), #52 (27 nm), #50 (28 nm), #40 (24 nm), #30 (30 nm), #25 (47 nm), #95 (40 nm) and CF9 (40 nm) from Mitsubishi Chemical Corporation; PRINNTEX 90 (14 nm), PRINTEX 95 (15 nm), PRINTEX 85 (16 nm), PRINTEX 75 (17 nm) from Degussa; #3950 (16 nm) from Mitsubishi Chemical Corporation.

Examples of specific coarse particulate carbon black products are given below: BLACK PEARLS 130 (75 nm), MONARCH 120 (75 nm) and Regal 99 (100 nm) from Cabot Corporation; Raven 450 (75 nm), Raven 420 (86 nm), Raven 410 (101 nm), Raven 22 (83 nm) and RAVEN MTP (275 nm) from Columbia Carbon Co., Ltd.; Asahi 50H (85 nm), Asahi #51 (91 nm), Asahi #50 (80 nm), Asahi #35 (78 nm) and Asahi #15 (122 nm) from Asahi Carbon Co., Ltd.; #10 (75 nm), #5 (76 nm) and #4010 (75 nm) from Mitsubishi Chemical Corporation; Thermal black (270 nm) from Cancarb Limited.

When employing two types of carbon black having different mean particle diameters in the backcoat layer, the ratio (by weight) of the content of microparticulate carbon black of 10 to 50 nm to that of coarse particulate carbon black of 70 to 300 nm preferably ranges from 100:0.5 to 100:100, more preferably from 100:1 to 100:50.

The content of carbon black in the backcoat layer (the total quantity when employing two types of carbon black) normally ranges from 30 to 100 weight parts, preferably 45 to 95 weight parts, per 100 weight parts of binder.

Two types of inorganic powder of differing hardness are desirably employed in combination. Specifically, a soft inorganic powder with a Mohs' hardness of 3 to 4.5 and a hard inorganic powder with a Mohs' hardness of 5 to 9 are desirably employed. The addition of a soft inorganic powder with a Mohs' hardness of 3 to 4.5 permits stabilization of the coefficient of friction during repeat running. Within the stated range, the sliding guide poles are not worn down. The mean particle diameter of the soft inorganic powder desirably ranges from 30 to 50 nm.

Examples of soft organic powders having a Mohs' hardness of 3 to 4.5 are calcium sulfate, calcium carbonate, calcium silicate, barium sulfate, magnesium carbonate, zinc carbonate, and zinc oxide. These may be employed singly or in combinations of two or more.

The content of the soft inorganic powder in the backcoat layer preferably ranges from 10 to 140 weight parts, more preferably 35 to 100 weight parts, per 100 weight parts of carbon black.

The addition of a hard inorganic powder with a Mohs' hardness of 5 to 9 increases the strength of the backcoat layer and improves running durability. When the hard inorganic powder is employed with carbon black and the above-described soft inorganic powder, deterioration due to repeat sliding is reduced and a strong backcoat layer is obtained. The addition of the hard inorganic powder imparts suitable abrasive strength and reduces adhesion of scrapings onto the tape guide poles and the like. Particularly when employed with a soft inorganic powder, sliding characteristics on guide poles with rough surface are enhanced and the coefficient of friction of the backcoat layer can be stabilized. The mean particle diameter of the hard inorganic powder preferably ranges from 80 to 250 nm, more preferably 100 to 210 nm.

Examples of hard inorganic powders having a Mohs' hardness of 5 to 9 are α-iron oxide, α-alumina, and chromium oxide ($Cr_2O_3$). These powders may be employed singly or in combination. Of these, α-iron oxide and α-alumina are preferred. The content of the hard inorganic powder is normally 3 to 30 weight parts, preferably 3 to 20 weight parts, per 100 weight parts of carbon black.

When employing the above-described soft inorganic powder and hard inorganic powder in combination in the backcoat layer, the soft inorganic powder and the hard inorganic powder are preferably selected so that the difference in hardness between the two is equal to or greater than 2 (more preferably equal to or greater than 2.5, further preferably equal to or greater than 3). The backcoat layer desirably comprises the above two types of inorganic powder having the above-specified mean particle sizes and difference in Mohs' hardness and the above two types of carbon black of the above-specified mean particle sizes.

The backcoat layer may also contain a lubricant. The lubricant may be suitably selected from among the lubricants given as examples above for use in the nonmagnetic layer and magnetic layer. The lubricant is normally added to the backcoat layer in a proportion of 1 to 5 weight parts per 100 weight parts of binder.

Nonmagnetic Support

Known films of the following may be employed as the nonmagnetic support in the present invention: polyethylene terephthalate, polyethylene naphthalate and other polyesters, polyolefins, cellulose triacetate, polycarbonate, polyamides, polyimides, polyamidoimides, polysulfones, aromatic polyamides, polybenzooxazoles and the like. Supports having a glass transition temperature of equal to or higher than 100° C. are preferably employed. The use of polyethylene naphthalate, aramid, or some other high-strength support is particularly desirable. As needed, layered supports such as disclosed in Japanese Unexamined Patent Publication (KOKAI) Heisei No. 3-224127, which is expressly incorporated herein by reference in its entirety, may be employed to vary the surface roughness of the magnetic surface and support surface. These supports may be subjected beforehand to corona discharge treatment, plasma treatment, adhesion enhancing treatment, heat treatment, dust removal, and the like.

The center surface average surface roughness (SRa) of the support measured with an optical interferotype surface roughness meter HD-2000 made by WYKO is preferably equal to or less than 8.0 nm, more preferably equal to or less than 4.0 nm, further preferably equal to or less than 2.0 nm. Not only does such a support desirably have a low center surface average surface roughness, but there are also desirably no large protrusions equal to or higher than 0.5 μm. The surface roughness shape may be freely controlled through the size and quantity of filler added to the support as needed. Examples of such fillers are oxides and carbonates of elements such as Ca, Si, and Ti, and organic fine powders such as acrylic-based one. The support desirably has a maximum height $R_{max}$ equal to or less than 1 μm, a ten-point average roughness $R_Z$ equal to or less than 0.5 μm, a center surface peak height $R_P$ equal to or less than 0.5 μm, a center surface valley depth $R_V$ equal to or less than 0.5 μm, a center-surface surface area percentage Sr of 10 percent to 90 percent, and an average wavelength $\lambda_a$ of 5 to 300 μm. To achieve desired electromagnetic characteristics and durability, the surface protrusion distribution of the support can be freely controlled with fillers. It is possible to control within a range from 0 to 2,000 protrusions of 0.01 to 1 μm in size per 0.1 mm².

The F-5 value of the nonmagnetic support employed in the present invention preferably ranges from 49 to 490 MPa. The thermal shrinkage rate of the support after 30 min at 100° C. is preferably equal to or less than 3 percent, more preferably equal to or less than 1.5 percent. The thermal shrinkage rate after 30 min at 80° C. is preferably equal to or less than 1 percent, more preferably equal to or less than 0.5 percent. The breaking strength of the nonmagnetic support preferably ranges from 49 to 980 MPa. The modulus of elasticity preferably ranges from 0.98 to 19.6 GPa. The thermal expansion coefficient preferably ranges from $10^{-4}$ to $10^{-8}$/° C., more preferably from $10^{-5}$ to $10^{-6}$/° C. The moisture expansion coefficient is preferably equal to or less than $10^{-4}$/RH percent, more preferably equal to or less than $10^{-5}$/RH percent. These thermal characteristics, dimensional characteristics, and mechanical strength characteristics are desirably nearly equal, with a difference equal to less than 10 percent, in all in-plane directions in the support.

Manufacturing Method

The process for manufacturing coating liquids for magnetic and nonmagnetic layers comprises at least a kneading step, a dispersing step, and a mixing step to be carried out, if necessary, before and/or after the kneading and dispersing steps. Each of the individual steps may be divided into two or more stages. All of the starting materials employed in the present invention, including the ferromagnetic powder, nonmagnetic powder, binders, carbon black, abrasives, antistatic agents, lubricants, solvents, and the like, may be added at the beginning of, or during, any of the steps. Moreover, the individual starting materials may be divided up and added during two or more steps. For example, polyurethane may be divided up and added in the kneading step, the dispersion step, and the mixing step for viscosity adjustment after dispersion. To achieve the object of the present invention, conventionally known manufacturing techniques may be utilized for some of the steps. A kneader having a strong kneading force, such as an open kneader, continuous kneader, pressure kneader, or extruder is preferably employed in the kneading step. When a kneader is employed, the ferromagnetic powder or nonmagnetic powder and all or part of the binder (preferably equal to or higher than 30 weight percent of the entire quantity of binder) can be kneaded in a range of 15 to 500 parts per 100 parts of the ferromagnetic powder. Details of the kneading process are described in Japanese Unexamined Patent Publication (KOKAI) Heisei Nos. 1-106338 and 1-79274. The contents of these applications are incorporated herein by reference in their entirety. Further, glass beads may be employed to disperse the coating liquids for magnetic and nonmagnetic layers, with a dispersing medium with a high specific gravity such as zirconia beads, titania beads, and steel beads being suitable for use. As set forth above, zirconia beads are preferably employed. The details of dispersion conditions such as the particle diameter and fill ratio of these dispersing media are as set forth above. A known dispersing device may be employed.

As set forth above, when coating a magnetic recording medium of multilayer configuration in the present invention, a wet-on-dry method is preferably employed, in which a coating liquid for forming a nonmagnetic layer is coated on the nonmagnetic support and dried to form a nonmagnetic layer, and then a coating liquid for forming a magnetic layer is coated on the nonmagnetic layer and dried.

When using a wet-on-wet method in which a coating liquid for forming a nonmagnetic layer is coated, and while this coating is still wet, a coating liquid for forming a magnetic layer is coated thereover and dried, the following methods are desirably employed:

(1) a method in which the nonmagnetic layer is first coated with a coating device commonly employed to coat magnetic coating materials such as a gravure coating, roll coating, blade coating, or extrusion coating device, and the magnetic layer is coated while the nonmagnetic layer is still wet by means of a support pressure extrusion coating device such as is disclosed in Japanese Examined Patent Publication (KOKOKU) Heisei No. 1-46186 and Japanese Unexamined Patent Publication (KOKAI) Showa No. 60-238179 and Japanese Unexamined Patent Publication (KOKAI) Heisei No. 2-265672, which are expressly incorporated herein by reference in their entirety;

(2) a method in which the upper and lower layers are coated nearly simultaneously by a single coating head having two built-in slits for passing coating liquid, such as is disclosed in Japanese Unexamined Patent Publication (KOKAI) Showa No. 63-88080, Japanese Unexamined Patent Publication (KOKAI) Heisei No. 2-17971, and Japanese Unexamined Patent Publication (KOKAI) Heisei No. 2-265672, which are expressly incorporated herein by reference in their entirety; and (3) a method in which the upper and lower layers are coated nearly simultaneously using an extrusion coating apparatus with a backup roller as disclosed in Japanese Unexamined Patent Publication (KOKAI) Heisei No. 2-174965, which is expressly incorporated herein by reference in its entirety. To avoid deteriorating the electromagnetic characteristics or the like of the magnetic recording medium by aggregation of magnetic particles, shear is desirably imparted to the coating liquid in the coating head by a method such as disclosed in Japanese Unexamined Patent Publication (KOKAI) Showa No. 62-95174 or Japanese Unexamined Patent Publication (KOKAI) Heisei No. 1-236968, which are expressly incorporated herein by reference in their entirety. In addition, the viscosity of the coating liquid preferably satisfies the numerical range specified in Japanese Unexamined Patent Publication (KOKAI) Heisei No. 3-8471, which are expressly incorporated herein by reference in its entirety.

Coating of coating liquid for each layer can be carried out with a coating device commonly employed to coat magnetic coating materials such as a gravure coating, roll coating, blade coating, or extrusion coating device.

The magnetic recording medium that has been coated and dried as mentioned above is normally calendered. The details of calendaring are as set forth above.

Physical Characteristics

The coefficient of friction of the magnetic recording medium relative to the head is preferably equal to or less than 0.5 and more preferably equal to or less than 0.3 at temperatures ranging from −10° C. to 40° C. and humidity ranging from 0 percent to 95 percent, the surface resistivity on the magnetic surface preferably ranges from $10^4$ to $10^{12}$ ohm/sq, and the charge potential preferably ranges from −500 V to +500 V. The modulus of elasticity at 0.5 percent extension of the magnetic layer preferably ranges from 980 to 19,600 MPa in each in-plane direction. The breaking strength preferably ranges from 98 to 686 MPa. The modulus of elasticity of the magnetic recording medium preferably ranges from 980 to 14,700 MPa in each in-plane direction. The residual elongation is preferably equal to or less than 0.5 percent, and the thermal shrinkage rate at all temperatures below 100° C. is preferably equal to or less than 1 percent, more preferably equal to or less than 0.5 percent, and most preferably equal to or less than 0.1 percent. The glass transition temperature (i.e., the temperature at which the loss elastic modulus of dynamic viscoelasticity peaks as measured at 110 Hz) of the magnetic layer preferably ranges from 50 to 120° C., and that of the nonmagnetic layer preferably ranges from 0 to 100° C. The loss elastic modulus preferably falls within a range of $1 \times 10^3$ to $8 \times 10^4 N/cm^2$ and the loss tangent is preferably equal to or less than 0.2. Adhesion failure tends to occur when the loss tangent becomes excessively large. These thermal characteristics and mechanical characteristics are desirably nearly identical, varying by 10 percent or less, in each in-plane direction of the medium. The residual solvent contained in the magnetic layer is preferably equal to or less than 100 mg/m² and more preferably equal to or less than 10 mg/m². The void ratio in the coated layers, including both the nonmagnetic layer and the magnetic layer, is preferably equal to or less than 30 volume percent, more preferably equal to or less than 20 volume percent. Although a low void ratio is preferable for attaining high output, there are some cases in which it is better to ensure a certain level based on the object.

The surface roughness Ra of the magnetic layer is preferably equal to or less than 3 nm, more preferably 1 to 2 nm. The maximum height $R_{max}$ of the magnetic layer is preferably equal to or less than 0.5 µm, the ten-point average surface roughness Rz is preferably equal to or less than 0.3 µm, the center surface peak height $R_P$ is preferably equal to or less than 0.3 µm, the center surface valley depth $R_V$ is preferably equal to or less than 0.3 µm, the center-surface surface area percentage Sr preferably ranges from 20 percent to 80 percent, and the average wavelength a preferably ranges from 5 to 300 µm.

When the magnetic recording medium has a nonmagnetic layer and magnetic layer, it will be readily deduced that the physical properties of the nonmagnetic layer and magnetic layer may be varied based on the objective. For example, the modulus of elasticity of the magnetic layer may be increased to improve running durability while simultaneously employing a lower modulus of elasticity than that of the magnetic layer in the nonmagnetic layer to improve the head contact of the magnetic recording medium.

Magnetic Head

The reproduction head comprised in the magnetic signal reproduction system of the present invention and employed in the magnetic signal reproduction method of the present invention is a magnetoresistive magnetic head comprising a spin-valve layer (also referred to as a "spin-valve MR head", hereinafter). As set forth above, the level of abrasion that is allowable with the spin-valve MR heads for high-density recording is low and they tend to undergo smearing. For example, Japanese Unexamined Patent Publication (KOKAI) No. 2002-197608, which is expressly incorporated herein by reference in its entirety, discloses the example of a magnetic head employing a Co-based amorphous alloy such as CoZrTa or CoZrNb on the sliding contact surface as a countermeasure to smearing. However, as high densification advances, it is thought that such countermeasure for the head alone will be inadequate in practical terms to solve the above-described problems in systems employed in even higher density recording. By contrast, in the present invention, the use of a magnetic recording medium having a magnetic layer exhibiting the above-described surface properties permits the use of a spin-valve MR head, the use of which in conventional sliding contact systems has been difficult, in a sliding contact system. Even with advances in recording density, if a signal that has been recorded at high density cannot be read with high sensitivity, good electromagnetic characteristics cannot be achieved. The present invention permits the reproduction with high sensitivity of signals recorded at high density through the use of spin-valve MR heads, which have much higher sensitivity than the AMR heads employed in conventional sliding contact systems. Thus, even higher densification is possible.

Spin-valve MR heads have a layer structure comprised of at least an antiferromagnetic layer, a fixed magnetization layer, and a free magnetization layer. In contrast to the fixed magnetization layer, in which the magnetization direction is fixed by the antiferromagnetic layer, the magnetization direction of the free magnetization layer changes with the external magnetic field. By making the magnetization direction of the fixed magnetization layer parallel with the direction of a changing external magnetic field and making the magnetization direction of the free magnetization layer perpendicular to the external magnetic field direction in advance when there is no external magnetic field, the resistance value of a current flowing through the spin-valve layer peaks when an external magnetic field causes the magnetization direction of the free magnetization layer to become the reverse of (antiparallel to) the magnetization direction of the fixed magnetization layer. Conversely, the resistance value of the current flowing through the spin-valve layer is minimized when the magnetization direction of the free magnetic layer is aligned (parallel) with the direction of magnetization of the fixed magnetization layer. In a spin-valve MR head, a signal that has been recorded on a magnetic recording medium can be detected by reading the resistance value, which changes based on the external magnetic field that is applied as set forth above.

A spin-valve MR head that can be employed in the present invention will be described below based on FIG. 1. However, the spin-valve MR head employed in the present invention is not limited to the form shown in FIG. 1.

FIG. 1 is a sectional view showing the main components of a spin-valve MR head. When a signal is reproduced by sliding contact with a magnetic recording medium, the signal is reproduced with the surface shown in FIG. 1 serving as the surface contacting with the medium. In the spin-valve head shown in FIG. 1, first shield layer 1, second gap layer 2, spin-valve layer 3, second gap layer 4, and second shield layer 5 are sequentially present on a support. A pair of hard magnetic layers 6 generating a bias magnetic field and a pair of electrode layers 7 applying a sense current to the spin-valve layer are further provided. However, the layer order of the individual layers is not limited to the form shown in FIG. 1, and can be suitably modified.

The support can be suitably selected by taking into account the expansion coefficient, thermal conductivity, electrical conductivity, processability, abrasion resistance, and the like. An example of a support material that is suitable for use is $Al_2O_3$—TiC. The support is normally about 0.5 to 10 mm in thickness, but the thickness is not specifically limited.

The first and second shield layers are preferably comprised of a material capable of magnetically shielding the spin-valve layer, exhibiting good soft magnetism, and affording good abrasion and corrosion resistance. For example, they can be comprised of magnetic material in the form of polycrystalline ferrites such as Fe—Si—Al alloys (sendust), Ni—Fe alloys (permalloy), and Ni—Zn alloy (hematite). Of these, to control smearing, in the first shield layer and/or the second shield layer, at least a surface that contacts with the magnetic recording medium during signal reproduction is preferably comprised of amorphous alloy comprising cobalt as a main component (also referred to as a "cobalt-based amorphous alloy", hereinafter) such as CoZrTa or CoZrNb. Smearing generally tends to occur on the upstream surface during sliding contact with the medium. Since a disk-shaped medium runs in a single direction during signal reproduction, at least the contact surface of the shield layer with the medium on the upstream side during running is preferably comprised of a cobalt-based amorphous alloy. Since a tapelike medium runs back and forth over the head during signal reproduction, both the first shield layer and second shield layer can be positioned upstream during running. Thus, when reproducing a signal on a tapelike medium, the contact surfaces of both the first and second shield layers with the medium are preferably comprised of a cobalt-based amorphous alloy.

The thickness of the first and second gap layers is preferably adjusted so that the free magnetization layer is positioned roughly in the center between the first and second shield layers. The distance between the first and second shield layers (distance between shields) is normally about 40 to 200 nm, and can be determined based on the required linear recording density. For example, for a linear recording density of 300 to 600 KBPI (kilobits/inch), it can be made about 60 to 160 nm.

The first and second gap layers can be comprised of nonmagnetic material such as alumina ($Al_2O_3$) that can function to isolate magnetically the spin-valve layer and the pair of shield layers.

The thickness of the first shield layer, second shield layer, first gap layer, and second gap layer is not specifically limited, and can be, for example, about 1 to 5 μm for each of the first and second shield layers, and about 10 to 100 nm for each of the first and second gap layers.

The above-described MR head can comprise one or more optional layers in addition to the various above-described layers. For example, an insulating layer can be present between the support and the first shield layer. The insulating layer can be comprised of an insulating material such as alumina ($Al_2O_3$) or silica ($SiO_2$). A recording head (such as an inductive head), protective layer, protective sheet, or the like can be present on the opposite surface from the support (on the second shield layer in FIG. 1). The recording head is normally comprised of a magnetic pole of high magnetic flux density (for example, equal to or greater than 1.6 T) and a thin-film coil. The protective layer is normally comprised of a nonmagnetic material; a variety of materials can be employed. For example, it can be comprised of an insulating material such as alumina ($Al_2O_3$) or silica ($SiO_2$), as is the above-described insulating layer. Materials other than those set forth above may also be employed as the material of protective layer so long as they are nonmagnetic conductive materials. However, considering environmental resistance and corrosion resistance, alumina ($Al_2O_3$) and silica ($SiO_2$) are desirable. The thickness of the protective layer is preferably about 10 to 50 μm when a protective sheet is provided above it, and about 30 to 100 μm when no protective sheet is provided.

The spin-valve layer comprises at least an antiferromagnetic layer, fixed magnetization layer, and free magnetization layer, and may further comprise a protective layer, nonmagnetic layer to magnetically isolate the fixed magnetization layer and free magnetization layer, underlayer, and the like. The spin-valve layer can function as a magnetoresistive element. The conductance of a sense current running in an in-plane direction relative to the spin-valve layer preferably changes in a manner dependent on the relative angle of magnetization of the fixed magnetization layer and free magnetization layer, that is, the spin-valve layer preferably exhibits so-called giant magnetoresistive (GMR) effect.

In the spin-valve layer, the antiferromagnetic layer, fixed magnetization layer, and free magnetization layer can be disposed in that order from the support side in what is known as a bottom spin valve configuration, or can be disposed from the support side in the order of a free magnetization layer, fixed magnetization layer, and antiferromagnetic layer, in what is known as a top spin valve configuration. The bottom spin valve configuration can yield better results.

In the fixed magnetization layer, also referred to as the "pinned layer," the magnetization is fixed in a prescribed direction by means of an exchange coupling field acting between the fixed magnetization layer and the antiferromagnetic layer. To fix the magnetization of the fixed magnetization layer, the fixed magnetization layer and antiferromagnetic layer are desirably disposed adjacent to each other. The thickness of the fixed magnetization layer is preferably 1.6 to 10 nm, more preferably 2 to 6 nm, to achieve good fixing of magnetization. The fixed magnetization layer can be comprised of CoFe or the like. It is preferably comprised of two layers with a nonmagnetic layer of Ru or the like sandwiched between them.

In the free magnetization layer, also referred to as the "free layer," the magnetization direction can be changed by an external magnetic field. The free magnetization layer can be comprised of CoFe, NiFe, or the like. The thickness of the free magnetization layer is not specifically limited, but can be about 1 to 10 nm, for example. A nonmagnetic layer is desirably provided between the fixed magnetization layer and free magnetization layer to magnetically isolate these two layers. An underlayer and/or protective layer are also desirably provided, for example, on the uppermost surface and/or lowermost surface of the spin-valve layer.

The antiferromagnetic layer is also referred to as the "pinning layer." The antiferromagnetic layer can be comprised of an alloy such as PtMn, NiO, CrMnPt, RhMn, NiMn, or PdPtMn. The thickness of the antiferromagnetic layer is not specifically limited, but is generally equal to or greater than 5 nm. A thick antiferromagnetic layer causes almost no problem, but excessive thickness may result in a large gap length (distance between shields) in the MR head, rendering it unsuitable for the reproduction of signals recorded at high density. From this perspective, the antiferromagnetic layer is preferably equal to or less than 100 nm in thickness. The thickness of the antiferromagnetic layer preferably falls within a range of 5 to 50 nm, more preferably, a range of 5 to 30 nm.

The MR head employed in the present invention can comprise a pair of electrode layers applying a current to the spin-valve layer. From the perspective of preventing smearing, in the electrode layer, at least a surface that contacts with the magnetic recording medium during signal reproduction is preferably comprised of metal comprising tantalum as a main component.

The connection positions (contact positions) of the electrode layers with the spin-valve layer are not specifically limited other than that they be able to apply a sense current to the spin-valve layer. As shown in FIG. 1, for example, they can be connected to the two edges of one of the surfaces of the spin-valve layer. The opposite edges of the electrode layers from those connected to the spin-valve layer are connected to an external circuit and supply current from the external circuit.

The MR head employed in the present invention can comprise a pair of hard magnetic layers for applying a bias magnetic field to the spin-valve layer. The bias magnetic field can be applied to stabilize the operation of the spin-valve layer (MR element). As shown in FIG. 1, the hard magnetic layers can be disposed at positions that connect to the two edges of the spin-valve layer in a longitudinal direction, for example. The material comprising the hard magnetic layers is not specifically limited other than that it permit the application of a bias magnetic field to the spin-valve layer; CoPtCr is desirable.

Each of the layers set forth above can be divided into two or more layers. The spin-valve MR head employed in the present invention can be manufactured by one or suitable combination of known film-forming methods such as sputtering, plating, and lift-off. Japanese Unexamined Patent Publication (KOKAI) No. 2000-340858 or English language family member U.S. Pat. No. 6,563,681, Japanese Unexamined Patent Publication (KOKAI) No. 2003-223705, and Japanese Unexamined Patent Publication (KOKAI) No. 2006-99872 or English language family member US 2006/0067011 A1 can be referenced with regard to spin-valve MR heads. The contents of these applications are incorporated herein by reference in their entirety.

The magnetic signal reproduction system of the present invention is preferably a sliding contact system in which the reproduction head comes in sliding contact with the magnetic recording medium during signal reproduction, and can be a tape drive and disk drive. The magnetic signal reproduction method of the present invention can be applied to such system.

Figure 2:
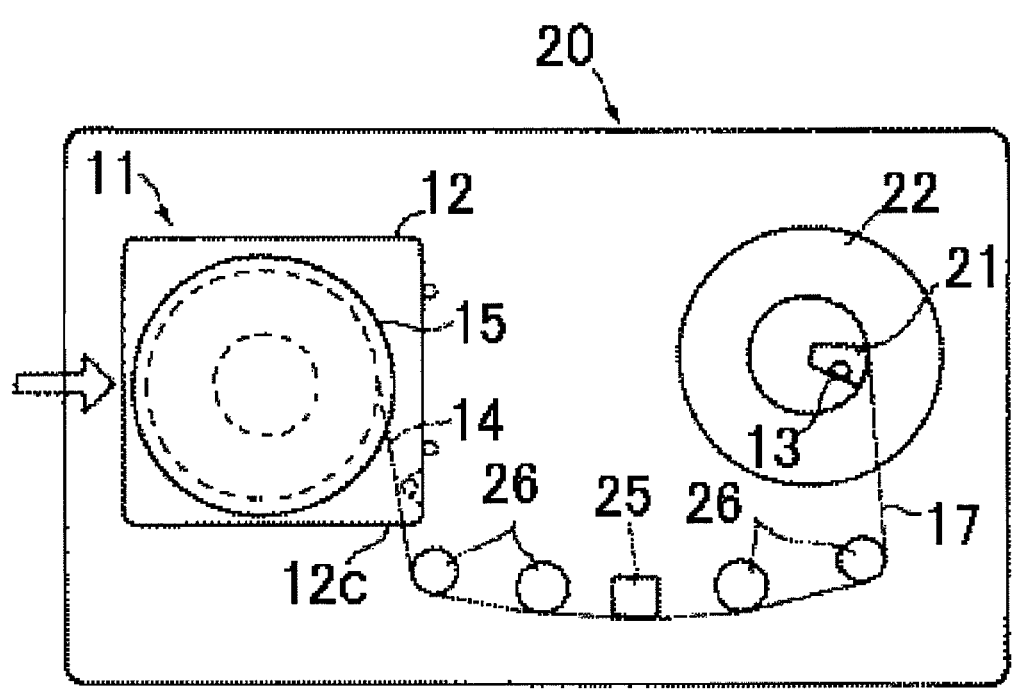
FIG. 2 is a schematic perspective view showing the configuration of a multichannel magnetic tape drive device comprising a thin-film magnetic head of the sliding contact type according to an embodiment of the present invention.

FIG. 2 is a schematic perspective view showing the configuration of a multichannel magnetic tape drive device comprising a thin-film magnetic head of the sliding contact type. 120 In the multichannel magnetic tape drive device, a sliding contact multichannel thin film magnetic head comprising a reading head element and writing head element with multiple channels is employed.

In FIG. 2, 11 denotes a tape cartridge with a single reel, 22 denotes a machine reel temporarily winding magnetic tape 14 with a width of ½ inch that is fed by tape cartridge 11, and 25 denotes a sliding contact thin-film magnetic head capable of moving back and forth in a direction (track width direction) perpendicular to the back and forth travel direction of magnetic tape 14. As shown in FIG. 2, magnetic tape 14 comes into sliding contact with magnetic head 25. Reference can be made to, for example, Japanese Unexamined Patent Publication (KOKAI) No. 2006-73194, which is expressly incorporated herein by reference in its entirety, with regard to sliding contact tape drive systems. In a tape drive device, the speed of the magnetic tape relative to the sliding contact thin-film magnetic head is normally 2 to 12 m/s and the tension is normally 0.3 to 1.2 N. In a disk drive device, the speed of the magnetic disk relative to the sliding contact thin-film magnetic head is normally 2 to 12 m/s, and the load is normally 3 to 5 g for a nanosized slider and 2 to 4 g for a picosized slider.

FIG. 2 is an example of a tape drive. However, as will be described further in Examples below, the present invention is also suitably applied to disk systems. For disk drive systems to which the present invention can be applied, reference can be made to Japanese Unexamined Patent Publication (KOKAI) No. 2007-73131 or English language family member US 2007/035877 A1, Japanese Unexamined Patent Publication (KOKAI) No. 2004-63027, Japanese Unexamined Patent Publication (KOKAI) No. 2007-179599 or English language family member US 2004/125502 A1, which are expressly incorporated herein by reference in their entirety, and the like.

According to the present invention, a spin-valve MR head can be employed to reproduce with high sensitivity a magnetic signal that has been recorded at high density. In particular, according to the present invention, a spin-valve MR head can be employed in a sliding contact system to permit the reproduction with high sensitivity of a signal that has been recorded at high density in a sliding contact system. For example, the present invention permits the reproduction with high sensitivity of signals that have been recorded at high densities of 2 to 20 Gbits/inch$^2$, as well as 5 to 15 Gbits/inch$^2$.

Reproduction signals that are reproduced with spin-valve MR heads are generally reproduced using PRMLs such as PR4, EPR4, and EEPR4. When the reproduction waveform of an independent wave has roughly left-right symmetry about the center of the position of reversal of magnetization, suitable detection can be achieved by these methods. However, when hexagonal ferrite powder is employed as ferromagnetic powder in the magnetic layer, the easy axis of magnetization comprises both an in-plane component and a perpendicular component, and the independent reproduction waveform will not necessarily have left-right symmetry about the center of the position of reversal of magnetization. In such cases, suitable target waveform adjustment by GPRML (generalized PRML) is desirable.

To handle signals recorded at high density, it is required to reduce the track width of the reproduction MR head. This reduces the MR height. Handling recording at high density requires reducing the reproduction gap length of the reproduction head. However, the shorter the MR height is made, the less abrasion that is permissible, and the more rapidly head performance tends to deteriorate. Further, the smaller the reproduction gap length, the more smearing tends to occur.

Thus, when employing an MR head designed for high-density recording in a conventional sliding contact system, there are problems in that the life of the head tends to be reduced and performance tends to deteriorate by head abrasion and smearing. By contrast, in the present invention, use of the magnetic recording medium having the above-described magnetic layer surface properties can prevent the above-described head abrasion and smearing while maintaining good running stability. Thus, the spin-valve MR head employed in the present invention can be designed to handle high-density recording at, for example, a track width ranging from 0.1 to 2 µm, an MR height ranging from 0.2 to 2 µm, and a reproduction gap length ranging from 0.06 to 0.16 µm. The detection of signals recorded at high density and their reproduction with high sensitivity is important to the achievement of higher densities. Accordingly, the fact that a high-sensitivity spin-valve MR head can be designed to handle high-density recording is extremely advantageous to achieving high densities in sliding contact systems.

EXAMPLES

The present invention will be described in detail below based on examples. However, the present invention is not limited to the examples. The term "parts" given in Examples are weight parts unless specifically stated otherwise.

1. Preparation of Magnetic Recording Medium

| Magnetic layer coating liquid A (ferromagnetic powder: barium ferrite) | |
| --- | --- |
| Ferromagnetic plate-like hexagonal ferrite powder | 100 parts |
| Composition other than oxygen (molar ratio): Ba/Fe/Co/Zn = 1/9/0.2/1 | |
| Hc: 176 kA/m | |
| Mean plate diatemer: 20 nm | |
| Mean plate ratio: 3 | |
| σs: 49 A·$m^2$/kg | |
| Polyurethane resin based on branched side chain comprising polyester polyol/diphenylmethane diisocyanate (—$SO_3Na$ = 400 eq/ton) | 17 parts |
| α-$Al_2O_3$ (mean particle diameter: 170 nm, Mohs' hardness: 9) | 10 parts |
| Carbon black (mean particle diameter: 75 nm) | 1 part |
| Cyclohexanone | 110 parts |
| Methyl ethyl ketone | 100 parts |
| Toluene | 100 parts |
| Butyl stearate | 1.5 parts |
| Stearic acid | 1 part |

| Magnetic layer coating liquid B (ferromagnetic powder: barium ferrite) | |
| --- | --- |
| Ferromagnetic plate-like hexagonal ferrite powder | 100 parts |
| Composition other than oxygen (molar ratio): Ba/Fe/Co/Zn = 1/9/0.2/1 | |
| Hc: 176 kA/m | |
| Mean plate diatemer: 20 nm | |
| Mean plate ratio: 3 | |
| σs: 49 A·$m^2$/kg | |
| Polyurethane resin based on branched side chain comprising polyester polyol/diphenylmethane diisocyanate (—$SO_3Na$ = 400 eq/ton) | 15 parts |
| Carbon black (mean particle diameter: 75 nm) | 1 part |
| Cyclohexanone | 100 parts |
| Methyl ethyl ketone | 100 parts |
| Toluene | 100 parts |
| Butyl stearate | 1.5 parts |
| Stearic acid | 1 part |

| Magnetic layer coating liquid C (ferromagnetic powder: metal powder) | |
| --- | --- |
| Ferromagnetic acicular metal powder | 100 parts |
| Composition: Fe/Co = 70/30 | |
| Surface treatment agent: $Al_2O_3$ | |
| Hc: 183.1 kA/m | |
| Crystallite size: 12 nm | |
| Mean major axis length: 0.05 μm | |
| Mean acicular ratio: 5 | |
| σs: 108 A·$m^2$/kg | |
| Polyurethane resin comprising dimer diol as a polyol Mw: 42000, Tg: 157° C., —$SO_3Na$ = 100 eq/ton | 15 parts |
| α-$Al_2O_3$ (mean particle diameter: 170 nm, Mohs' hardness: 9) | 10 parts |
| Carbon black (mean particle diameter: 75 nm) | 1 part |
| Cyclohexanone | 30 parts |
| Methyl ethyl ketone | 90 parts |
| Toluene | 60 parts |
| Butyl stearate | 1.5 parts |
| Stearic acid | 0.5 part |

| Magnetic layer coating liquid D (ferromagnetic powder: metal powder) | |
| --- | --- |
| Ferromagnetic acicular metal powder | 100 parts |
| Composition: Fe/Co = 70/30 | |
| Surface treatment agent: $Al_2O_3$ | |
| Hc: 183.1 kA/m | |
| Crystallite size: 12 nm | |
| Mean major axis length: 0.05 μm | |
| Mean acicular ratio: 5 | |
| σs: 108 A·$m^2$/kg | |
| Polyurethane resin comprising dimer diol as a polyol Mw: 42000, Tg: 157° C., —$SO_3Na$ = 100 eq/ton | 15 parts |
| Carbon black (mean particle diameter: 75 nm) | 1 part |
| Cyclohexanone | 30 parts |
| Methyl ethyl ketone | 90 parts |
| Toluene | 60 parts |
| Butyl stearate | 1.5 parts |
| Stearic acid | 0.5 part |

| Nonmagnetic layer coating liquid | |
| --- | --- |
| Nonmagnetic inorganic powder (α-iron oxide) | 80 parts |
| Surface treatment agent: $Al_2O_3$, $SiO_2$ | |
| Major axis diameter: 0.15 μm | |
| Tap density: 0.8 | |
| Acicular ratio: 7 | |
| BET specific surface area: 52 $m^2$/g | |
| pH: 8 | |
| DBP oil absorption capacity: 33 g/100 g | |
| Carbon black | 20 parts |
| DBP oil absorption capacity: 120 ml/100 g | |
| pH: 8 | |
| BET specific surface area: 250 $m^2$/g | |
| Volatile content: 1.5 percent | |
| Polyurethane resin based on branched side chain comprising polyester polyol/diphenylmethane diisocyanate (—$SO_3Na$ = 120 eq/ton) | 20 parts |
| Phenylphosphonic acid | 3 parts |
| Cyclohexanone | 140 parts |
| Methyl ethyl ketone | 170 parts |
| Butyl stearate | 1 part |
| Stearic acid | 1 part |

| Abrasive paste liquid | |
| --- | --- |
| Polyurethane resin based on branched side chain comprising polyester polyol/diphenylmethane diisocyanate (—$SO_3Na$ = 400 eq/ton) | 2 parts |
| α-$Al_2O_3$ (mean particle diameter: 80 nm, Mohs' hardness: 9) | 10 parts |
| Cyclohexanone | 8 parts |

(Preparation of Sample M1)

After kneading the various components of the magnetic layer coating liquid A in an open kneader for 60 minutes, zirconia beads (1.0 mm) were packed at a bead packing rate of 80 percent in a horizontal circulating-type pin-type sand mill disperser and dispersion was conducted in the disperser at a pin tip peripheral speed of 10 m/s to achieve a dispersion retention time of 30 min. To the dispersion obtained were added 6 parts of trifunctional low-molecular-weight polyisocyanate compound (Coronate 3041 made by Nippon Polyurethane Industry Co., Ltd.). After stirring for 20 minutes, the mixture was filtered with a filter having a mean pore size of 0.5 μm to prepare a magnetic layer coating liquid.

After kneading the various components of the above nonmagnetic layer coating liquid in an open kneader for 60 minutes, zirconia beads (1.0 mm) were packed at a bead packing rate of 80 percent in a horizontal circulating-type pin-type sand mill disperser and dispersion was conducted in the disperser at a pin tip peripheral speed of 10 m/s to achieve a dispersion retention time of 30 min. To the dispersion obtained were added 6 parts of trifunctional low-molecular-weight polyisocyanate compound (Coronate 3041 made by Nippon Polyurethane Industry Co., Ltd.). After stirring for 20 minutes, the mixture was filtered with a filter having a mean pore size of 0.5 μm to prepare a nonmagnetic layer coating liquid.

The nonmagnetic layer coating liquid obtained above was coated in a quantity calculated to yield a dry thickness of 1.5 μm to a polyethylene terephthalate support 32 μm in thickness having a center surface average roughness of 1.8 nm. Immediately thereafter, while the nonmagnetic layer coating liquid was still wet, the magnetic layer coating liquid obtained above was coated in a quantity calculated to yield a dry thickness of 60 nm (wet-on-wet coating) and dried at 100° C. Surface smoothing was then conducted with a seven-stage configuration of calenders comprised solely of metal rolls at a speed of 100 m/min, a linear pressure of 269.5 kN/m, and a temperature of 90° C., after which punching was conducted on disks 1.8 inches in diameter. Subsequently, a heat treatment was conducted for 24 hours at 70° C. to promote curing of the various coating layers.
(Preparation of Sample M2)

After kneading the various components of the magnetic layer coating liquid B in an open kneader for 60 minutes, zirconia beads (0.5 mm) were packed at a bead packing rate of 80 percent in a horizontal circulating-type pin-type sand mill disperser and dispersion was conducted in the disperser at a pin tip peripheral speed of 10 m/s to achieve a dispersion retention time of 120 min. The above abrasive paste liquid was passed twice at a flow rate of 300 g/min through a flow-type ultrasonic disperser (1,200 W, frequency of 20 KHz, irradiating member surface diameter of 50 mm, 3 mm gap between irradiating member and holder, amplitude of 30 μm), with the paste liquid separate from the magnetic layer coating liquid.

The magnetic layer coating liquid obtained was mixed with the abrasive paste liquid with a stirrer, 6 parts of trifunctional low-molecular-weight polyisocyanate compound (Coronate 3041 made by Nippon Polyurethane Industry Co., Ltd.) were added, and the mixture was stirred for 20 minutes. The mixture was then filtered with a filter having a mean pore size of 0.5 μm to prepare a magnetic layer coating liquid.

After kneading the various components of the above nonmagnetic layer coating liquid in an open kneader for 60 minutes, zirconia beads (1.0 mm) were packed at a bead packing rate of 80 percent in a horizontal circulating-type pin-type sand mill disperser and dispersion was conducted in the disperser at a pin tip peripheral speed of 10 m/s to achieve a dispersion retention time of 30 min. To the dispersion obtained were added 6 parts of trifunctional low-molecular-weight polyisocyanate compound (Coronate 3041 made by Nippon Polyurethane Industry Co., Ltd.) and 20 parts of cyclohexanone. After stirring for 20 minutes, the mixture was filtered with a filter having a mean pore size of 0.5 μm to prepare a nonmagnetic layer coating liquid.

The nonmagnetic layer coating liquid obtained above was coated in a quantity calculated to yield a dry thickness of 1.5 μm to a polyethylene terephthalate support 32 plm in thickness having a center surface average roughness of 1.8 nm, and dried. The magnetic layer coating liquid obtained above was then coated thereover in a quantity calculated to yield a dry thickness of 60 nm (wet-on-dry coating) and dried at 100° C. Surface smoothing was then conducted with a seven-stage configuration of calenders comprised solely of metal rolls at a speed of 100 m/min, a linear pressure of 269.5 kN/m, and a temperature of 90° C., after which punching was conducted on disks 1.8 inches in diameter. Subsequently, a heat treatment was conducted for 24 hours at 70° C. to promote curing of the various coating layers.
(Preparation of Samples M3 to 10 and M12 to 20)

Samples M3 to 10 and M12 to 20 were prepared by the same method as sample M2, with the exceptions that the following were changed to the conditions described in Table 1: the particle diameter of the dispersion medium and the retention time of the magnetic layer coating liquid; the type, particle diameter, and quantity of abrasive added; the quantity of butyl stearate added to the magnetic layer and nonmagnetic layer coating liquids; and the calendering temperature and pressure. The diamond employed as abrasive in sample M15 had a Mohs' hardness of 10.
(Preparation of Sample M11)

Sample M11 was prepared by the same method as sample M1, with the exceptions that the following were changed to the conditions described in Table 1: the particle diameter of the dispersion medium and the retention time of the magnetic layer coating liquid; the particle diameter of the abrasive; and the quantity of butyl stearate added to the magnetic layer and nonmagnetic layer coating liquids.
(Preparation of Sample M21)

Sample M21 was prepared by the same method as sample M2, with the exceptions that the particle diameter of the dispersion medium of the magnetic layer coating liquid, the quantity of abrasive added, and the calendering temperature and pressure were changed to the conditions described in Table 1, and the coating method was changed from wet-on-dry coating to wet-on-wet coating.
(Preparation of Sample M22)

After kneading the various components of the magnetic layer coating liquid D in an open kneader for 60 minutes, zirconia beads (0.5 mm) were packed at a bead packing rate of 80 percent in a horizontal circulating-type pin-type sand mill disperser and dispersion was conducted in the disperser at a pin tip peripheral speed of 10 m/s to achieve a dispersion retention time of 120 min. The above abrasive paste liquid was passed twice at a flow rate of 300 g/min through a flow-type ultrasonic disperser (1,200 W, frequency of 20 KHz, irradiating member surface diameter of 50 mm, 3 mm gap between irradiating member and holder, amplitude of 30 μm), with the paste liquid separate from the magnetic layer coating liquid.

The magnetic layer coating liquid obtained was mixed with the abrasive paste liquid with a stirrer, 6 parts of trifunctional low-molecular-weight polyisocyanate compound (Coronate 3041 made by Nippon Polyurethane Industry Co., Ltd.) and 20 parts of cyclohexanone were added, and the mixture was stirred for 20 minutes. The mixture was then filtered with a filter having a mean pore size of 0.5 μm to prepare a magnetic layer coating liquid.

After kneading the various components of the above nonmagnetic layer coating liquid in an open kneader for 60 minutes, zirconia beads (1.0 mm) were packed at a bead packing rate of 80 percent in a horizontal circulating-type pin-type sand mill disperser and dispersion was conducted in the disperser at a pin tip peripheral speed of 10 m/s to achieve a dispersion retention time of 30 min. To the dispersion obtained were added 6 parts of trifunctional low-molecular-weight polyisocyanate compound (Coronate 3041 made by Nippon Polyurethane Industry Co., Ltd.). After stirring for 20 minutes, the mixture was filtered with a filter having a mean pore size of 0.5 µm to prepare a nonmagnetic layer coating liquid.

The nonmagnetic layer coating liquid obtained above was coated in a quantity calculated to yield a dry thickness of 1.5 µm to a polyethylene terephthalate support 32 µm in thickness having a center surface average roughness of 1.8 nm, and dried. The magnetic layer coating liquid obtained above was then coated thereover in a quantity calculated to yield a dry thickness of 60 nm (wet-on-dry coating) and dried at 100° C. Surface smoothing was then conducted with a seven-stage configuration of calenders comprised solely of metal rolls at a speed of 100 m/min, a linear pressure of 269.5 kN/m, and a temperature of 90° C., after which punching was conducted on disks 1.8 inches in diameter. Subsequently, a heat treatment was conducted for 24 hours at 70° C. to promote curing of the various coating layers.

(Preparation of Sample M23)

After kneading the various components of the magnetic layer coating liquid C in an open kneader for 60 minutes, zirconia beads (1.0 mm) were packed at a bead packing rate of 80 percent in a horizontal circulating-type pin-type sand mill disperser and dispersion was conducted in the disperser at a pin tip peripheral speed of 10 m/s to achieve a dispersion retention time of 30 min. To the dispersion obtained were added 6 parts of triflunctional low-molecular-weight polyisocyanate compound (Coronate 3041 made by Nippon Polyurethane Industry Co., Ltd.). After stirring for 20 minutes, the mixture was filtered with a filter having a mean pore size of 0.5 µm to prepare a magnetic layer coating liquid.

After kneading the various components of the above nonmagnetic layer coating liquid in an open kneader for 60 minutes, zirconia beads (1.0 mm) were packed at a bead packing rate of 80 percent in a horizontal circulating-type pin-type sand mill disperser and dispersion was conducted in the disperser at a pin tip peripheral speed of 10 m/s to achieve a dispersion retention time of 30 min. To the dispersion obtained were added 6 parts of triftmctional low-molecular-weight polyisocyanate compound (Coronate 3041 made by Nippon Polyurethane Industry Co., Ltd.). After stirring for 20 minutes, the mixture was filtered with a filter having a mean pore size of 0.5 lm to prepare a nonmagnetic layer coating liquid.

The nonmagnetic layer coating liquid obtained above was coated in a quantity calculated to yield a dry thickness of 1.5 µm to a polyethylene terephthalate support 32 µm in thickness having a center surface average roughness of 1.8 nm. Immediately thereafter, while the nonmagnetic layer coating liquid was still wet, the magnetic layer coating liquid obtained above was coated in a quantity calculated to yield a dry thickness of 60 nm (wet-on-wet coating) and dried at 100° C. Surface smoothing was then conducted with a seven-stage configuration of calenders comprised solely of metal rolls at a speed of 100 m/min, a linear pressure of 269.5 kN/m, and a temperature of 90° C., after which punching was conducted on disks 1.8 inches in diameter. Subsequently, a heat treatment was conducted for 24 hours at 70° C. to promote curing of the various coating layers.

(Preparation of Samples M24 to 28)

With the exception that the magnetic material added to the magnetic layer coating liquid was changed to barium ferrite having the mean plate diameters given in Table 1, samples M24 to 28 were prepared by the same method as M2.

(Preparation of Samples M29 to 34)

With the exception that the thickness of the magnetic layer was changed to the values given in Table 1, samples M29 to 34 were prepared by the same method as M2.

(Preparation of Sample M35)

After kneading the various components of the magnetic layer coating liquid B in an open kneader for 60 minutes, zirconia beads (0.5 mm) were packed at a bead packing rate of 80 percent in a horizontal circulating-type pin-type sand mill disperser and dispersion was conducted in the disperser at a pin tip peripheral speed of 10 m/s to achieve a dispersion retention time of 120 min. The above abrasive paste liquid was passed twice at a flow rate of 300 g/min through a flow-type ultrasonic disperser (1,200 W, frequency of 20 KHz, irradiating member surface diameter of 50 mm, 3 mm gap between irradiating member and holder, amplitude of 30 µm), with the paste liquid separate from the magnetic layer coating liquid.

The magnetic layer coating liquid obtained was mixed with the abrasive paste liquid with a stirrer, 6 parts of trifunctional low-molecular-weight polyisocyanate compound (Coronate 3041 made by Nippon Polyurethane Industry Co., Ltd.) were added, and the mixture was stirred for 20 minutes. The mixture was then filtered with a filter having a mean pore size of 0.5 µm to prepare a magnetic layer coating liquid.

After kneading the various components of the above nonmagnetic layer coating liquid in an open kneader for 60 minutes, zirconia beads (1.0 mm) were packed at a bead packing rate of 80 percent in a horizontal circulating-type pin-type sand mill disperser and dispersion was conducted in the disperser at a pin tip peripheral speed of 10 m/s to achieve a dispersion retention time of 30 min. To the dispersion obtained were added 6 parts of trifunctional low-molecular-weight polyisocyanate compound (Coronate 3041 made by Nippon Polyurethane Industry Co., Ltd.) and 20 parts of cyclohexanone. After stirring for 20 minutes, the mixture was filtered with a filter having a mean pore size of 0.5 µm to prepare a nonmagnetic layer coating liquid.

The nonmagnetic layer coating liquid obtained above was coated in a quantity calculated to yield a dry nonmagnetic layer thickness of 1.5 µm to a polyethylene naphthalate film 4 µm in thickness (having heat contraction rates of 0.8 percent lengthwise and 0.6 percent crosswise at 105° C., 30 min and a center surface average roughness of 2.0 nm) and dried at 100° C. The magnetic layer coating liquid obtained above was then coated thereover in a quantity calculated to yield a dry thickness of 60 nm (wet-on-dry coating) and dried at 100° C. Next, a backcoat layer coating liquid was coated in a quantity calculated to yield a backcoat layer thickness of 0.5 plm following drying and calendering to the opposite side of the nonmagnetic support from the side on which the nonmagnetic and magnetic layers had been formed, and dried. Subsequently, surface smoothing was conducted with a seven-stage configuration of calenders comprised solely of metal rolls at a speed of 100 m/min, a linear pressure of 269.5 kN/m, and a temperature of 90° C. The backcoat layer coating liquid was prepared by dispersing the backcoat layer coating liquid components listed below in a sand mill at a retention time of 45 min, adding 8.5 parts of polyisocyanate, stirring, and filtering.

| Backcoat layer coating liquid components | |
|---|---|
| Carbon black (mean particle diameter: 25 nm) | 40.5 parts |
| Carbon black (meal particle diameter: 370 nm) | 0.5 part |
| Barium sulfate | 4.05 parts |

-continued

| Backcoat layer coating liquid components | |
|---|---|
| Nitrocellulose | 28 parts |
| Polyurethane resin (containing SO$_3$Na group) | 20 parts |
| Cyclohexanone | 100 parts |
| Toluene | 100 parts |
| Methyl ethyl ketone | 100 parts |

The magnetic sheet thus obtained was processed to a mirror surface in a seven-stage calendar (temperature 90° C., linear pressure 294 kN/m) and thermoprocessed for 48 hours at 60° C. and 40 percent RH. It was then cut to a ½ inch width. The magnetic layer surface was then polished with a diamond wheel (rotational speed+150 percent, winding angle of 30°) while being run at 100 m/min, to prepare a magnetic tape. The magnetic tape was assembled in a cartridge to obtain a computer tape.

2. Media Evaluation (1) AFM Protrusion Number

For each sample, the number of protrusions equal to or greater than 10 nm in height from the standard plane where the volume of protrusions was equal to that of indentations within a square 30 μm on a side on the surface of the magnetic layer was measured at a resolution of 512×512 pixels with an SiN probe in the form of a rectangular cone with an edge angle of 70 degrees using a Nanoscope 3 made by Digital Instruments Corp, and the measured value was converted to a corresponding value for a square 100 μm on a side.

(2) Magnetic Layer Surface Lubricant Index (i) Auger Electron Spectroscopic Analysis The sample was divided into two portions, one portion (a) of which was left intact and the other portion (b) of which was processed by the method set forth below to remove the lubricant component, after which the two portions were measured by Auger electron spectroscope.

Measurement Conditions

Auger Electron Spectroscope: Auger electron spectroscope (Model PHI-660) made by the U.S. PHI Corporation.
Primary electron acceleration voltage: 3 kV
Sample current: 130 mA
Magnification: 250-fold
Tilt angle: 30°
Kinetic energy: $2.08 \times 10^{-17}$ to $1.17 \times 10^{-16}$ J ($\approx$130-730 eV)
Total number: The intensity of the KLL peak of carbon (C) and the intensity of the LMM peak of iron (Fe) were measured three times in differential form, the ratio C/Fe was obtained, and the intensity ratio of (a) and (b) (C/Fe(a)/C/Fe(b)) was calculated as the surface lubricant index.

(ii) Method of Removing Lubricant Component

The sample (10×30 mm) was immersed for 30 min in n-hexane at ordinary temperature and non-adsorbing fatty acids and fatty esters were extracted and removed. Next, the sample was placed in a sample bottle and 10 mL of n-hexane and 0.3 mL of TMSI-H (hexamethyldisilazane (HMDS): trimethylchlorosilane (TMCS): pyridine mixture, made by Gel Science), a silylating agent employed as a derivatizing reagent, were added. The mixture was then subjected to a derivatization reaction with heating for 1 hour at 60° C., the sample was removed, washed with ethanol and dried to remove the lubricant component.

(3) Surface Abrasive Occupancy of the Magnetic Layer

A scanning electron microscope (FE-SEM) was used to pick up a reflected electron image at an acceleration voltage of 2 kV, an operating distance of 3 mm, and a pick-up magnification of 20,000-fold as a 1024×764 pixel TIFF file at a resolution of 70 pixels/inch, this file was converted to binary using an image analyzer in the form of a KS400 Ver. 3.0 made by Carl Zeiss, Inc., and the ratio of the area occupied by abrasive to the total area was calculated.

(4) Measurement of the Mean Particle Diameter of the Magnetic Material (a) Removal of Magnetic Material From the Medium Sample The magnetic material was extracted from the medium sample by the following procedure.

1. The surface of the medium sample was subjected to 1 to 2 minutes of surface processing with a plasma reactor made by Yamato Science and the organic components (binder/curing agent, and the like) on the sample surface were removed by incineration.
2. A filter paper impregnated with an organic solvent such as cyclohexanone or acetone was attached to the edge portion of a metal rod, the surface of the sample prepared in 1. above was rubbed thereon, and the magnetic layer component was transferred from the sample to the paper.
3. The sample separated in 2. was removed by oscillation in a solvent such as cyclohexanone or acetone (the filter paper was placed in solvent and the sample was removed by oscillation with an ultrasonic disperser), the solvent was dried, and the component that had been removed was collected.
4. The component that was removed in 3. was charged to a glass test tube that had been thoroughly washed, a quantity (about 20 mL) of n-butylamine capable of decomposing the binder in the magnetic layer component was added, and the glass test tube was sealed.
5. The glass test tube was heated for equal to or more than 20 hours at 170° C. to decompose the binder and curing agent components among the three components.
6. The precipitate following amine decomposition prepared in 5. was thoroughly washed with pure water and dried, after which the inorganic components in the form of the magnetic material, abrasive, and the like were collected.

(b) Measurement of the Size of the Particles Collected

The component collected in (a) above was ultrasonically dispersed in pure water, placed on a copper mesh or the like, and observed at a magnification of equal to or greater than 100,000-fold at which particles could be adequately determined with a transmission electron microscope (Model H-9000 made by Hitachi).

The surface of the particles in the photographic image that was picked up was trimnmed with a digitizer and image processed by size distribution measurement. For hexagonal ferrite, the plate diameter and plate thickness of 300 magnetic particles were measured and averaged. For acicular magnetic powder, the major axis length and minor axis length of 300 magnetic particles were measured and averaged. Image processing was conducted with an Imaging Systems Ver. 3 made by Carl Zeiss, Inc. Scale correction in scanner image pickup and image analysis was conducted with a circle 1 cm in diameter.

(5) Measurement of the Average Thickness of the Magnetic Layer

The average thickness of the magnetic layer was measured by the following procedure.

(a) Obtaining a Sectional Image of the Medium Sample

An ultrathin sectional slice was cut from the medium sample (section thickness: about 80 to 100 nm) with an ultramicrotome employing an embedded block. Transmission electron microscope (TEM H-9000 made by Hitachi) was used to photograph a sample cross-section of the ultrathin sectional slice that had been cut; 25 to 30 μm partial photographs were taken centered on the boundary between the magnetic layer and nonmagnetic layer at a magnification of 100,000-fold to obtain a continuous sectional image of the medium sample.

(b) Calculation of the Average Thickness of the Magnetic Layer

Based on the continuous photographs obtained, lines were drawn by eye at the surface of the magnetic layer and at the magnetic layer/nonmagnetic layer boundary, the magnetic layer was trimed, the trimmed magnetic layer line was picked up with a scanner, and the width between the magnetic layer surface and the magnetic layer/nonmagnetic layer boundary was image processed to calculate the average thickness of the magnetic layer. Image processing was conducted with a KS Imaging System Ver. 3 made by Carl Zeiss, Inc. by measuring the thickness width of the magnetic layer at nearly 2,100 points at intervals of 12.5 nm in the longitudinal direction of the magnetic layer. The image pickup with a scanner and scale correction in the course of image analysis were conducted with lines having an actual size of 2 cm.

3. Preparation of Magnetic Head (Preparation of Head H1)

A spin-valve GMR head having the layer configuration shown in FIG. 1 was prepared. As shown in Table 2, CoZrTa (a cobalt-based amorphous alloy) was employed as the first shield layer and Ta was employed as the electrode layers in fabricating the GMR head. A 1.8 T pole material was used to fabricate a recording-use inductive head over a nonmagnetic layer comprised of $Al_2O_3$ on the second shield layer. A protective layer comprised of $Al_2O_3$ about 100 µm in thickness was formed thereover. On the sliding contact surface side, a DLC film about 3 nm in thickness was formed with a roughly 2 nm underlayer of Si. The spin-valve layer was of the bottom type, with, sequentially stacked from the support side, an antiferromagnetic layer (7 nm in thickness), a fixed magnetization layer (of CoFe, 4.5 nm in thickness), a nonmagnetic layer (of Cu, 2.5 nm in thickness), and a free magnetization layer (comprised of the two layers of CoFe (1 nm in thickness)/NiFe (4 nm in thickness)).

(Preparation of Head H2)

With the exceptions that the materials of the first shield layer and the electrode layers were changed as indicated in Table 2, head H2 was prepared by the same method as head H1.

(Preparation of Head H3)

A spin-valve GMR head having the same layer configuration as H1 was prepared. However, since tape systems are run in two directions, CoZrTa was employed in both the first and second shield layers. After forming and treating for smoothness a protective layer comprised of $Al_2O_3$ 20 µm in thickness, a protective sheet of $Al_2O_3$—TiC was adhered.

(Preparation of Magnetic Head H0)

Head H0 had the same layer configuration as head H1 with the exception that an MR effect based on an AMR film was employed without a spin-valve layer. An MR layer with a multilayered configuration comprised of NiFeCr (12 nm in thickness)/Ta (6 nm in thickness)/NiFe (25 nm in thickness)/Ta (4 nm in thickness) was employed. To achieve required performance, the reproduction track width was set to triple (0.9 µm) that of H1.

4. Running Method (1) Disk Sample Running

Employing heads H0 to H2 in groups of two each, head stack assemblies (HSAs) were assembled and the following running method was employed to run the various sample disks.

The HSA was mounted on a spin stand (LS90) made by Kyodo Electronics, Inc. The individual disk samples (flexible disks processed to a diameter of 1.8 inches) were run at a disk rotational speed of 3,676 rpm. During running, settings were made so that the HSA made a round trip over a range from a radius of 11 mm to a radius of 22 mm (a relative speed range from 4.2 m/s to 8.5 m/s) on the 1.8 inch disk in 10 seconds and continuous running was conducted in a clean room (class 1000) environment. The load during running was 4.2 g (using a nanosized slider).

(2) Tape Sample Running

Figure 3:
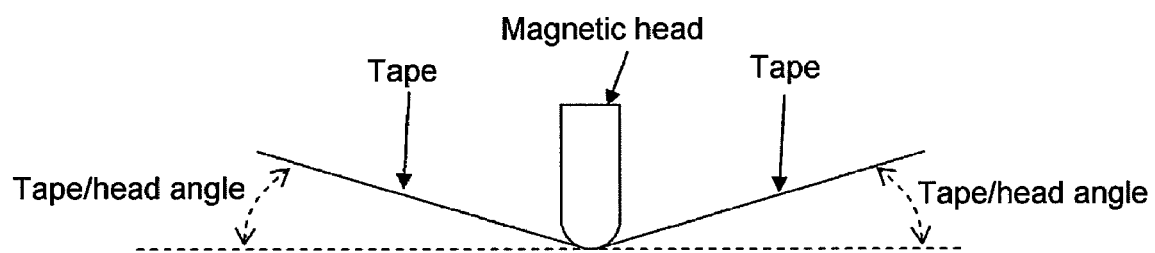
FIG. 3 is a drawing descriptive of the tape sample running method in Examples.

Using a magnetic tape tester, an 800 m spool of sample tape was run at a speed of 6 m/s, a back tension of 0.7 N, and a tape/head angle (½ lap angle) of 10 degrees (see FIG. 3) while winding and rewinding the tape from reel to reel.

5. Evaluation Methods

Each sample was subjected to tests A to E below. In tests A to C, evaluation was conducted on 10 units of each sample and a non-defective product rate was calculated. In each test, a non-defective product rate of equal to or greater than 70 percent was determined to be good. The results are given in Table 1.

[Test A: Evaluation of Head Life (Head Abrasion)]

(1) Disk Samples

The combination of magnetic recording media and magnetic heads listed in Table 1 were subjected to 100 hours of running using the above "Running method." A Quasi-Static Tester QST-2002 made by ISI Corp. was employed to measure the amplitude at a measurement magnetic field of ±100 [Oe] before and after running. Those in which the decrease was equal to or less than 50 percent before and after running were considered to have "Passed," and those in which the amplitude was less than 50 percent were considered to have "Failed."

(2) Tape Sample

Using linear head H3, tape sample M35 was run back and forth 300 times by the above "Running method." A Quasi-Static Tester QST-2002 made by ISI Corp. was employed to measure the amplitude at a measurement magnetic field of ±100 [Oe] before and after running. Those in which the decrease was equal to or less than 50 percent before and after running were considered to have "Passed," and those in which the amplitude was less than 50 percent were considered to have "Failed."

[Test B: Evaluation of Head Life (Smearing)]

(1) Disk Samples

The combinations of magnetic recording media and magnetic heads listed in Table 1 were subjected to 24 hours of running using the above "Running method." The change in MR resistance (MRR) during running was measured. A disk exhibiting a decrease in resistance during running of equal to or less than 10 percent relative to the initial value was considered to have "Passed" and a decrease exceeding 10 percent was considered to have "Failed."

(2) Tape Sample

Using linear head H3, tape sample M35 was run back and forth 300 times using the above "Running method" and the change in MR resistance (MR) during running was measured. A tape exhibiting a decrease in resistance during running of equal to or less than 10 percent relative to the initial value was considered to have "Passed" and a decrease exceeding 10 percent was considered to have "Failed."

[Test C: Evaluation of Element Corrosion]

(1) Disk Samples

Levels 1 to 36 in Table 1: HSAs that were run for 1 minute by the above "Running method" with the combinations of magnetic recording media and magnetic heads listed in Table 1

These HSAs were placed for 96 hours in an environment of 85° C. and 85 percent RH, the MR resistance (MRR) was measured before and after, and the change in resistance was calculated. A change in resistance of equal to or less than 2 percent was considered to have "Passed" and a change in resistance exceeding 2 percent was considered to have "Failed." Since the change in resistance was caused by corrosion of the MR element, the change in resistance could be used as an indicator of element corrosion.

(2) Tape Sample

Level 37 in Table 1: Employing linear head H3, tape sample M35 was run for one minute using the above "Running method." Subsequently, linear head H3 was placed for 96 hours in an environment of 85° C. and 85 percent RH, the MR resistance (MRR) was measured before and after, and the change in resistance was calculated. A change in resistance of equal to or less than 2 percent was considered to have "Passed" and a change in resistance exceeding 2 percent was considered to have "Failed." In the same manner as in the evaluation of the above disksamples, since the change in resistance was caused by corrosion of the MR element, the change in resistance could be used as an indicator of element corrosion.

[Test D: Evaluation of Electromagnetic Characteristics (SNR)]

(1) Disk Samples

A 19.0 MHz signal (linear recording density of 160 KFCI) was recorded and reproduced at 3,676 rpm at a radial position of 15.7 mm using a read-write analyzer RWA 1632 made by Guzik Corp. of the U.S., a spin stand (LS90) made by Kyodo Electronics, Inc., new HSAs, and various disk samples (flexible disks processed to diameters of 1.8 inches). The reproduction signal was inputted to an R3361C made by Advantest Corp. The signal output (S) was measured at a peak signal of 19.0 MHz, and the integral noise (N) was measured over a range of 1 MHz to 37.7 MHz excluding 19.0 MHz±0.3 MHz. The ratio was adopted as the SNR. In the results given in Table 1, the difference with the value measured for Level 24 is indicated as a value relative to Level 24.

(2) Tape Sample

A 19.0 MHz signal (linear recording density of 160 KFCI) was recorded and reproduced while running tape sample M35 using the above "Running method" with linear head H3. The reproduction signal was inputted to an R3361C made by Advantest Corp. The signal output (S) was measured at a peak signal of 19.0 MHz, and the integral noise (N) was measured over a range of 1 MHz to 37.7 MHz excluding 19.0 MHz±0.3 MHz. The ratio was adopted as the SNR.

[Test E: Evaluation of Running Durability (Coefficient of Friction)]

(1) Disk Samples

A new HSA was mounted on a microload load cell (LTS-50GAA made by Kyowa) and settings were made for a radius of 17.5 mm and a skew angle of 0 degree for the various disk samples (flexible disks processed to a diameter of 1.8 inches). The coefficient of friction was calculated from the force borne by the load cell and the head load during running at a disk rotational speed of 3,676 rpm.

(2) Tape Sample

The tension in front and behind the head (on the entry side and exit side) was measured while running tape sample M35 using the above "Running method" with linear head H3. Denoting the tension on the entry side as T1, the tension on the exit side as T2, and the lap angle θ (=10×2=20 degree=0.35 rad), assuming the head sliding contact surface to be cylindrical, and employing Euler's belt theory, coefficient of friction μ was calculated by the following equation:

$$\mu = \frac{1}{\theta}\log\frac{T2}{T1}$$

6. Evaluation of Results

TABLE 1

| | | Media type | Magnetic material | Mean plate diameter of BaFe/ Mean major axis diameter of MP (nm) | Dispersion conditions of magnetic liquid | | Abrasive formulation | | |
|---|---|---|---|---|---|---|---|---|---|
| | Level | | | | Dispersion media particle diameter (mm) | Retention time (min) | Type | Particle diameter (nm) | Quantity added (Parts) |
| Reference Ex. | 1 | M1 | BaFe | 20 | 1.0 | 30 | α-alumina | 170 | 10 |
| Comp. Ex. | 2 | M1 | BaFe | 20 | 1.0 | 30 | α-alumina | 170 | 10 |
| Example | 3 | M2 | BaFe | 20 | 0.5 | 120 | α-alumina | 80 | 10 |
| Example | 4 | M3 | BaFe | 20 | 0.5 | 120 | α-alumina | 80 | 10 |
| Example | 5 | M4 | BaFe | 20 | 0.5 | 90 | α-alumina | 80 | 10 |
| Example | 6 | M5 | BaFe | 20 | 0.5 | 90 | α-alumina | 80 | 10 |
| Example | 7 | M6 | BaFe | 20 | 0.5 | 60 | α-alumina | 80 | 10 |
| Comp. Ex. | 8 | M7 | BaFe | 20 | 0.5 | 60 | α-alumina | 80 | 10 |
| Example | 9 | M8 | BaFe | 20 | 0.1 | 120 | α-alumina | 80 | 10 |
| Example | 10 | M9 | BaFe | 20 | 0.1 | 120 | α-alumina | 80 | 10 |
| Comp. Ex. | 11 | M10 | BaFe | 20 | 0.1 | 120 | α-alumina | 80 | 10 |
| Comp. Ex. | 12 | M11 | BaFe | 20 | 0.5 | 120 | α-alumina | 80 | 10 |
| Example | 13 | M12 | BaFe | 20 | 0.5 | 120 | α-alumina | 80 | 5 |
| Example | 14 | M13 | BaFe | 20 | 0.5 | 120 | α-alumina | 80 | 15 |
| Example | 15 | M14 | BaFe | 20 | 0.5 | 120 | α-alumina | 40 | 10 |
| Example | 16 | M15 | BaFe | 20 | 0.5 | 120 | Diamond | 40 | 15 |
| Comp. Ex. | 17 | M16 | BaFe | 20 | 0.1 | 120 | α-alumina | 80 | 20 |
| Comp. Ex. | 18 | M17 | BaFe | 20 | 0.5 | 120 | α-alumina | 80 | 10 |
| Example | 19 | M18 | BaFe | 20 | 0.5 | 120 | α-alumina | 80 | 10 |
| Example | 20 | M19 | BaFe | 20 | 0.5 | 120 | α-alumina | 80 | 10 |

TABLE 1-continued

| | Level | | | | | | | |
|---|---|---|---|---|---|---|---|---|
| Example | 21 | M20 | BaFe | 20 | 0.5 | 120 | α-alumina | 80 | 10 |
| Comp. Ex. | 22 | M21 | BaFe | 20 | 0.1 | 120 | α-alumina | 80 | 15 |
| Examle | 23 | M2 | BaFe | 20 | 0.5 | 120 | α-alumina | 80 | 10 |
| Example | 24 | M22 | MP | 50 | 0.5 | 120 | α-alumina | 80 | 10 |
| Comp. Ex. | 25 | M23 | MP | 50 | 1.0 | 30 | α-alumina | 170 | 10 |
| Example | 26 | M24 | BaFe | 7 | 0.5 | 120 | α-alumina | 80 | 10 |
| Example | 27 | M25 | BaFe | 10 | 0.5 | 120 | α-alumina | 80 | 10 |
| Example | 28 | M26 | BaFe | 30 | 0.5 | 120 | α-alumina | 80 | 10 |
| Example | 29 | M27 | BaFe | 50 | 0.5 | 120 | α-alumina | 80 | 10 |
| Example | 30 | M28 | BaFe | 60 | 0.5 | 120 | α-alumina | 80 | 10 |
| Example | 31 | M29 | BaFe | 20 | 0.5 | 120 | α-alumina | 80 | 10 |
| Example | 32 | M30 | BaFe | 20 | 0.5 | 120 | α-alumina | 80 | 10 |
| Example | 33 | M31 | BaFe | 20 | 0.5 | 120 | α-alumina | 80 | 10 |
| Example | 34 | M32 | BaFe | 20 | 0.5 | 120 | α-alumina | 80 | 10 |
| Example | 35 | M33 | BaFe | 20 | 0.5 | 120 | α-alumina | 80 | 10 |
| Example | 36 | M34 | BaFe | 20 | 0.5 | 120 | α-alumina | 80 | 10 |
| Example | 37 | M35 | BaFe | 20 | 0.5 | 120 | α-alumina | 80 | 10 |

| | Level | Coating method | Magnetic layer thickness (nm) | Fatty ester formulation(magnetic layer/Nonmagnetic layer) Quantity added (Parts) | Calendering conditions Processing temperature (° C.) | Processing pressure |
|---|---|---|---|---|---|---|
| Reference Ex. | 1 | wet on wet | 60 | 1.5/1 | 90 | 269.5 kN/m |
| Comp. Ex. | 2 | wet on wet | 60 | 1.5/1 | 90 | 269.5 kN/m |
| Example | 3 | wet on dry | 60 | 1.5/1 | 90 | 269.5 kN/m |
| Example | 4 | wet on dry | 60 | 1.2/0.8 | 80 | 225.4 kN/m |
| Example | 5 | wet on dry | 60 | 1.8/1.2 | 90 | 269.5 kN/m |
| Example | 6 | wet on dry | 60 | 1.5/1 | 80 | 225.4 kN/m |
| Example | 7 | wet on dry | 60 | 2.1/1.4 | 90 | 269.5 kN/m |
| Comp. Ex. | 8 | wet on dry | 60 | 1.8/1.2 | 80 | 225.4 kN/m |
| Example | 9 | wet on dry | 60 | 1.2/0.8 | 90 | 269.5 kN/m |
| Example | 10 | wet on dry | 60 | 1.5/1 | 100 | 343 kN/m |
| Comp. Ex. | 11 | wet on dry | 60 | 1.8/1.2 | 110 | 490 kN/m |
| Comp. Ex. | 12 | wet on wet | 60 | 0.9/0.6 | 90 | 269.5 kN/m |
| Example | 13 | wet on dry | 60 | 1.2/0.8 | 80 | 225.4 kN/m |
| Example | 14 | wet on dry | 60 | 1.8/1.2 | 100 | 343 kN/m |
| Example | 15 | wet on dry | 60 | 1.5/1 | 90 | 269.5 kN/m |
| Example | 16 | wet on dry | 60 | 1.5/1 | 90 | 269.5 kN/m |
| Comp. Ex. | 17 | wet on dry | 60 | 1.2/0.8 | 90 | 269.5 kN/m |
| Comp. Ex. | 18 | wet on dry | 60 | 0.3/0.2 | 100 | 343 kN/m |
| Example | 19 | wet on dry | 60 | 0.5/0.3 | 100 | 294 kN/m |
| Example | 20 | wet on dry | 60 | 1.0/0.5 | 90 | 343 kN/m |
| Example | 21 | wet on dry | 60 | 2.1/1.4 | 90 | 225.4 kN/m |
| Comp. Ex. | 22 | wet on wet | 60 | 1.5/1 | 80 | 225.4 kN/m |
| Examle | 23 | wet on dry | 60 | 1.5/1 | 90 | 269.5 kN/m |
| Example | 24 | wet on dry | 60 | 1.5/1 | 90 | 269.5 kN/m |
| Comp. Ex. | 25 | wet on wet | 60 | 1.5/1 | 90 | 269.5 kN/m |
| Example | 26 | wet on dry | 60 | 1.5/1 | 90 | 269.5 kN/m |
| Example | 27 | wet on dry | 60 | 1.5/1 | 90 | 269.5 kN/m |
| Example | 28 | wet on dry | 60 | 1.5/1 | 90 | 269.5 kN/m |
| Example | 29 | wet on dry | 60 | 1.5/1 | 90 | 269.5 kN/m |
| Example | 30 | wet on dry | 60 | 1.5/1 | 90 | 269.5 kN/m |
| Example | 31 | wet on dry | 5 | 1.5/1 | 90 | 269.5 kN/m |
| Example | 32 | wet on dry | 10 | 1.5/1 | 90 | 269.5 kN/m |
| Example | 33 | wet on dry | 20 | 1.5/1 | 90 | 269.5 kN/m |
| Example | 34 | wet on dry | 100 | 1.5/1 | 90 | 269.5 kN/m |
| Example | 35 | wet on dry | 150 | 1.5/1 | 90 | 269.5 kN/m |

TABLE 1-continued

| | | | | | | |
|---|---|---|---|---|---|---|
| Example | 36 | wet on dry | 160 | 1.5/1 | 90 | 269.5 kN/m |
| Example | 37 | wet on dry | 60 | 1.5/1 | 90 | 269.5 kN/m |

| | Level | Media type | Magnetic layer surface properties — AFM protrusion number (equal to or greater than 10 nm in height) per 10000 μm² | Surface abrasive occupancy % | Surface lubricant index | Reproduction head Head | Test A (head abrasion) Non-defective product rate | Test B (smearing) Non-defective product rate | Test C (element corrosion) Non-defective product rate | Test D SNR (dB) | Test E (coefficient of friction) |
|---|---|---|---|---|---|---|---|---|---|---|---|
| Reference Ex. | 1 | M1 | 4000 | 5 | 3.0 | H0 | 100% | 100% | 100% | −1.5 | 0.25 |
| Comp. Ex. | 2 | M1 | 4000 | 5 | 3.0 | H1 | 0% | 0% | 100% | −3.0 | 0.25 |
| Example | 3 | M2 | 500 | 5 | 3.0 | H1 | 100% | 100% | 100% | 3.0 | 0.30 |
| Example | 4 | M3 | 1000 | 5 | 3.0 | H1 | 100% | 100% | 100% | 2.5 | 0.30 |
| Example | 5 | M4 | 1500 | 5 | 3.0 | H1 | 100% | 100% | 100% | 2.5 | 0.30 |
| Example | 6 | M5 | 2000 | 5 | 3.0 | H1 | 80% | 80% | 100% | 1.0 | 0.25 |
| Example | 7 | M6 | 2500 | 5 | 3.0 | H1 | 80% | 80% | 100% | 1.0 | 0.25 |
| Comp. Ex. | 8 | M7 | 3000 | 5 | 3.0 | H1 | 30% | 30% | 100% | −2.0 | 0.25 |
| Example | 9 | M8 | 100 | 5 | 3.0 | H1 | 100% | 100% | 100% | 3.5 | 0.35 |
| Example | 10 | M9 | 50 | 5 | 3.0 | H1 | 100% | 100% | 100% | 3.5 | 0.35 |
| Comp. Ex. | 11 | M10 | 20 | 5 | 3.0 | H1 | 30% | 30% | 60% | 3.5 | 0.60 |
| Comp. Ex. | 12 | M11 | 500 | 1 | 3.0 | H1 | 40% | 40% | 60% | 3.0 | 0.50 |
| Example | 13 | M12 | 500 | 2 | 3.0 | H1 | 100% | 100% | 100% | 3.0 | 0.35 |
| Exemple | 14 | M13 | 500 | 10 | 3.0 | H1 | 100% | 100% | 100% | 3.0 | 0.25 |
| Example | 15 | M14 | 500 | 15 | 3.0 | H1 | 100% | 100% | 100% | 3.0 | 0.25 |
| Example | 16 | M15 | 500 | 20 | 3.0 | H1 | 100% | 100% | 100% | 2.5 | 0.25 |
| Comp. Ex. | 17 | M16 | 500 | 25 | 3.0 | H1 | 0% | 0% | 100% | 2.0 | 0.25 |
| Comp. Ex. | 18 | M17 | 500 | 5 | 0.3 | H1 | 30% | 30% | 0% | 3.0 | 0.60 |
| Example | 19 | M18 | 500 | 5 | 0.5 | H1 | 100% | 100% | 100% | 3.0 | 0.35 |
| Example | 20 | M19 | 500 | 5 | 1.0 | H1 | 100% | 100% | 100% | 3.0 | 0.30 |
| Example | 21 | M20 | 500 | 5 | 5.0 | H1 | 100% | 100% | 100% | 3.0 | 0.25 |
| Comp. Ex. | 22 | M21 | 500 | 5 | 6.0 | H1 | 50% | 50% | 100% | 3.0 | 0.50 |
| Example | 23 | M2 | 500 | 5 | 3.0 | H2 | 80% | 80% | 100% | 3.0 | 0.30 |
| Example | 24 | M22 | 1500 | 5 | 3.0 | H1 | 70% | 70% | 100% | 0.0 | 0.35 |
| Comp. Ex. | 25 | M23 | 4500 | 5 | 3.0 | H1 | 0% | 0% | 100% | −6.0 | 0.25 |
| Example | 26 | M24 | 2500 | 5 | 3.0 | H1 | 80% | 80% | 100% | 1.0 | 0.25 |
| Example | 27 | M25 | 1000 | 5 | 3.0 | H1 | 100% | 100% | 100% | 2.0 | 0.25 |
| Example | 28 | M26 | 500 | 5 | 3.0 | H1 | 100% | 100% | 100% | 2.0 | 0.30 |
| Example | 29 | M27 | 1000 | 5 | 3.0 | H1 | 100% | 100% | 100% | 1.0 | 0.25 |
| Example | 30 | M28 | 2500 | 5 | 3.0 | H1 | 80% | 80% | 100% | 0.0 | 0.25 |
| Example | 31 | M29 | 2500 | 20 | 5.0 | H1 | 70% | 70% | 100% | 1.0 | 0.25 |
| Example | 32 | M30 | 1500 | 15 | 4.0 | H1 | 100% | 100% | 100% | 1.5 | 0.25 |
| Example | 33 | M31 | 1000 | 10 | 3.5 | H1 | 100% | 100% | 100% | 1.0 | 0.25 |
| Example | 34 | M32 | 500 | 5 | 2.0 | H1 | 100% | 100% | 100% | 2.0 | 0.30 |
| Example | 35 | M33 | 1500 | 5 | 1.0 | H1 | 100% | 100% | 100% | 1.0 | 0.30 |
| Example | 36 | M34 | 2500 | 5 | 0.5 | H1 | 80% | 80% | 100% | 1.0 | 0.35 |
| Example | 37 | M35 | 500 | 5 | 3.0 | H3 | 100% | 100% | 100% | 24 (measured value) | 0.30 |

Note)
BaFe: Barium ferrite
MP: Metal powder

TABLE 2

| Head | Head type | First shield layer | Electrode layer | Reproduction Track width | MR height | Reproduction gap length |
|---|---|---|---|---|---|---|
| H0 | AMR | CoZrTa | Ta | 0.9 μm | 0.6 μm | 0.17 μm |
| H1 | GMR | CoZrTa | Ta | 0.3 μm | 0.2 μm | 0.12 μm |
| H2 | GMR | NiFe | Au alloy | 0.3 μm | 0.2 μm | 0.12 μm |
| H3 (linear head) | GMR | CoZrTa | Ta/Cu | 0.5 μm | 0.3 μm | 0.12 μm |

6. Evaluation Results (1) Comparison of AMR Head and Spin-Valve GMR Heads

A comparison of Level 1 and Level 2 reveals that even for an AFM protrusion number of 4,000, the AMR head exhibited good evaluation results for head life and element corrosion. By contrast, the spin-valve GMR heads exhibited markedly poor head life. The results of test D indicate that protrusions that did not cause noise in the AMR head increased noise in the highly sensitive spin-valve GMR heads, causing the SNR to deteriorate.

In Table 1, the SNR of Level 1 was kept to an SNR of −1.5 dB relative to Level 24 (Example). However, this was because of the wide reproduction track width of AMR head H0 employed at Level 1. Upon track width conversion, it was much worse than −1.5 dB. It is difficult to reproduce with high sensitivity signals that had been recorded on narrow tracks with such reproduction head.

(2) Effect of Magnetic Layer Surface Properties When Employing a Spin-Valve GMR Head Good results were obtained for head life, element corrosion, electromagnetic characteristics, and the head coefficient of friction at Levels 3 to 7, 9, 10, 13 to 16, 19 to 21, 23, 24, 26 to 37, which combined medium samples with AFM protrusion numbers ranging from 50 to 2,500, magnetic layer surface lubricant indexes ranging from 0.5 to 5.0, and magnetic layer surface abrasive occupancies ranging from 2 to 20 percent with spin-valve GMR heads. The prevention of element corrosion was attributed to the fact that although the DLC film provided to prevent corrosion was removed by continuous running, during which the head came into sliding contact with the disk, sliding contact with the head during continuous running caused lubricant on the magnetic layer surface to be transferred to the sliding contact surface of the head, with the transferred lubricant functioning as a corrosion-preventing agent on the head surface. To confirm this point, an HSA that had been ultrasonically washed for one minute with n-hexane after running with the combination of Level 3 for 1 minute using the above "Running method" was subjected to evaluation by Test C, exhibiting marked element corrosion and the non-defective product rate of 0 percent. In an HSA that was subjected to evaluation by Test C by the same method with the exception that the head had been changed to H2, marked element corrosion also occurred and the non-defective product rate was 0 percent. The fact that marked element corrosion occurred in HSAs where washing was conducted with n-hexane after continuous running in this manner to remove the lubricant that had been transferred to the head surface, was a result that supported the role of corrosion-preventing agent performed on the head surface by the lubricant transferred from the magnetic layer surface.

A comparison of Level 5 (in which hexagonal ferrite powder was employed) and Level 24 (in which ferromagnetic metal power was employed) in which different ferromagnetic powders were employed, but the AFM protrusion numbers, magnetic layer surface lubricant indexes, and magnetic layer surface abrasive occupancies were the same reveals that better results were achieved by Level 5. This was attributed to the magnetic layer containing hexagonal ferrite powder having greater resistance to plastic deformation than the magnetic layer containing ferromagnetic metal powder as set forth above, as well as a smaller area of contact with the head.

Level 8, which had an AFM protrusion number of 3,000, and Level 25, which had an AFM protrusion number of 4,500, exhibited diminished head life and an SNR that deteriorated as the noise increased. Both Level 11, which had an AFM protrusion number of 20, and Level 12, which had a magnetic layer surface abrasive occupancy of 1 percent, exhibited increased coefficients of friction, diminished head life, and element corrosion. Level 17, which had a magnetic layer surface abrasive occupancy of 25 percent, exhibited markedly reduced head life. This was attributed to an excessively large amount of abrasive being present on the surface of the magnetic layer.

Level 18, which had a magnetic layer surface lubricant index of 0.3, exhibited diminished head life, element corrosion, and a greatly increased coefficient of friction. The decrease in head life was attributed to the small quantity of lubricant present on the magnetic layer surface causing an increase in the frictional force between the head and the medium during running. The element corrosion was attributed to the small quantity of lubricant present on the magnetic layer surface preventing an adequate quantity of lubricant from being transferred to the sliding contact surface of the head during continuous running. Further, Level 22, which had a magnetic layer surface lubricant index of 6.0, exhibited an increased coefficient of friction and diminished head life.

The above results reveal that in the present invention, by controlling the surface properties of the magnetic layer, when a spin-valve GMR head is employed, the use of which in conventional sliding contact systems has been considered difficult, it becomes possible to design the head for narrow track widths, short MR heights, and narrow gap lengths, and thus to reproduce with high sensitivity signals that have been recorded at high density.

(3) Effect of Head Materials

A comparison of Levels 3 and 23, in which different heads were run on identical disks reveals that although both yielded good results, better head life was achieved with head H1, in which the first shield layer, which was positioned upstream during sliding contact, was comprised of a cobalt-based amorphous alloy and the electrode layers were comprised of tantalum, than when H2 was employed. These results reveal that it was possible to further extend head life by changing the head material.

Based on the present invention, it is possible to reproduce with high sensitivity signals that have been recorded at high density with a spin-valve MR head in a sliding contact system.

Although the present invention has been described in considerable detail with regard to certain versions thereof, other versions are possible, and alterations, permutations and equivalents of the version shown will become apparent to those skilled in the art upon a reading of the specification and study of the drawings. Also, the various features of the versions herein can be combined in various ways to provide additional versions of the present invention. Furthermore, certain terminology has been used for the purposes of descriptive clarity, and not to limit the present invention. Therefore, any appended claims should not be limited to the description of the preferred versions contained herein and should include all such alterations, permutations, and equivalents as fall within the true spirit and scope of the present invention.

Having now fully described this invention, it will be understood to those of ordinary skill in the art that the methods of the present invention can be carried out with a wide and equivalent range of conditions, formulations, and other parameters without departing from the scope of the invention or any embodiments thereof.

All patents and publications cited herein are hereby fully incorporated by reference in their entirety. The citation of any publication is for its disclosure prior to the filing date and should not be construed as an admission that such publication is prior art or that the present invention is not entitled to antedate such publication by virtue of prior invention.

Unless otherwise stated, a reference to a compound or component includes the compound or component by itself, as well as in combination with other compounds or components, such as mixtures of compounds.

As used herein, the singular forms "a," "an," and "the" include the plural reference unless the context clearly dictates otherwise.

Except where otherwise indicated, all numbers expressing quantities of ingredients, reaction conditions, and so forth used in the specification and claims are to be understood as being modified in all instances by the term "about." Accordingly, unless indicated to the contrary, the numerical parameters set forth in the following specification and attached claims are approximations that may vary depending upon the desired properties sought to be obtained by the present invention. At the very least, and not to be considered as an attempt to limit the application of the doctrine of equivalents to the scope of the claims, each numerical parameter should be construed in light of the number of significant digits and ordinary rounding conventions.

Additionally, the recitation of numerical ranges within this specification is considered to be a disclosure of all numerical values and ranges within that range. For example, if a range is from about 1 to about 50, it is deemed to include, for example, 1, 7, 34, 46.1, 23.7, or any other value or range within the range.

What is claimed is:

1. A magnetic signal reproduction system comprising:
    a magnetic recording medium comprising a magnetic layer comprising a ferromagnetic powder and a binder on a nonmagnetic support; and
    a reproduction head,
    wherein
    a number of protrusions equal to or greater than 10 nm in height on the magnetic layer surface, as measured by an atomic force microscope, ranges from 50 to 2500/10,000 $\mu m^2$,
    a quantity of lubricant on the magnetic layer surface, denoted as a surface lubricant index, ranges from 0.5 to 5.0,
    a surface abrasive occupancy of the magnetic layer ranges from 2 to 20 percent, and
    the reproduction head is a magnetoresistive magnetic head comprising a spin-valve layer.

2. The magnetic signal reproduction system according to claim 1, wherein the ferromagnetic powder is a hexagonal ferrite powder.

3. The magnetic signal reproduction system according to claim 2, wherein the hexagonal ferrite powder has a mean plate diameter ranging from 10 to 50 nm.

4. The magnetic signal reproduction system according to claim 1, wherein the magnetic layer has a thickness ranging from 10 to 150 nm.

5. The magnetic signal reproduction system according to claim 1, wherein the reproduction head comprises at least a first shield layer, a first gap layer, a spin-valve layer, a second gap layer and a second shield layer in this order on a support.

6. The magnetic signal reproduction system according to claim 1, wherein the reproduction head comes in sliding contact with the magnetic recording medium during signal reproduction.

7. The magnetic signal reproduction system according to claim 5, wherein the reproduction head comes in sliding contact with the magnetic recording medium during signal reproduction and at least a surface of the first shield layer and/or the second shield layer that contacts with the magnetic recording medium during signal reproduction is comprised of amorphous alloy comprising cobalt as a main component.

8. The magnetic signal reproduction system according to claim 6, wherein the reproduction head has an electrode layer applying an electric current to the spin-valve layer, and at least a surface of the electrode layer that contacts with the magnetic recording medium during signal reproduction is comprised of metal comprising tantalum as a main component.

9. The magnetic signal reproduction system according to claim 1, wherein the spin-valve layer exhibits a giant magnetoresistive effect.

10. A magnetic signal reproduction method for reproducing signals, that have been recorded on a magnetic recording medium, with a reproduction head, wherein
    the magnetic recording medium comprises a magnetic layer comprising a ferromagnetic powder and a binder on a nonmagnetic support,
    a number of protrusions equal to or greater than 10 nm in height on the magnetic layer surface, as measured by an atomic force microscope, ranges from 50 to 2500/10,000 $\mu m^2$,
    a quantity of lubricant on the magnetic layer surface, denoted as a surface lubricant index, ranges from 0.5 to 5.0,
    a surface abrasive occupancy of the magnetic layer ranges from 2 to 20 percent, and
    the reproduction head is a magnetoresistive magnetic head comprising a spin-valve layer.

11. The magnetic signal reproduction method according to claim 10, wherein the ferromagnetic powder is a hexagonal ferrite powder.

12. The magnetic signal reproduction method according to claim 11, wherein the hexagonal ferrite powder has a mean plate diameter ranging from 10 to 50 nm.

13. The magnetic signal reproduction method according to claim 10, wherein the magnetic layer has a thickness ranging from 10 to 150 nm.

14. The magnetic signal reproduction method according to claim 10, wherein the reproduction head comprises at least a first shield layer, a first gap layer, a spin-valve layer, a second gap layer and a second shield layer in this order on a support.

15. The magnetic signal reproduction method according to claim 10, wherein the reproduction head comes in sliding contact with the magnetic recording medium during signal reproduction.

16. The magnetic signal reproduction method according to claim 14, wherein the reproduction head comes in sliding contact with the magnetic recording medium during signal reproduction and at least a surface of the first shield layer and/or the second shield layer that contacts with the magnetic recording medium during signal reproduction is comprised of amorphous alloy comprising cobalt as a main component.

17. The magnetic signal reproduction method according to claim 15, wherein the reproduction head has an electrode layer applying an electric current to the spin-valve layer, and at least a surface of the electrode layer that contacts with the magnetic recording medium during signal reproduction is comprised of metal comprising tantalum as a main component.

18. The magnetic signal reproduction method according to claim 10, wherein the spin-valve layer exhibits a giant magnetoresistive effect.

* * * * *